United States Patent
Blok et al.

(10) Patent No.: US 12,459,295 B2
(45) Date of Patent: *Nov. 4, 2025

(54) FUNCTIONALIZED POLYMERS TREAD ADDITIVE TO IMPROVE TIRE PERFORMANCE FOR IMMISCIBLE ALL-SEASON TREAD

(71) Applicant: ExxonMobil Chemical Patents Inc., Baytown, TX (US)

(72) Inventors: Edward J. Blok, Huffman, TX (US); Paul T. Q. Nguyen, League City, TX (US); Anthony J. Dias, Houston, TX (US); Ranjan Tripathy, Sugar Land, TX (US); Jason A. Mann, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 537 days.

This patent is subject to a terminal disclaimer.

(21) Appl. No.: 17/783,036

(22) PCT Filed: Dec. 9, 2020

(86) PCT No.: PCT/US2020/064007
§ 371 (c)(1),
(2) Date: Jun. 7, 2022

(87) PCT Pub. No.: WO2021/126627
PCT Pub. Date: Jun. 24, 2021

(65) Prior Publication Data
US 2023/0043808 A1    Feb. 9, 2023

Related U.S. Application Data

(60) Provisional application No. 62/949,151, filed on Dec. 17, 2019.

(51) Int. Cl.
*B60C 1/00* (2006.01)
*C08L 7/00* (2006.01)
*C08L 9/06* (2006.01)

(52) U.S. Cl.
CPC ............. *B60C 1/0016* (2013.01); *C08L 7/00* (2013.01); *C08L 9/06* (2013.01)

(58) Field of Classification Search
CPC ................ C08L 7/00; C08L 9/06; B60C 1/00
USPC ........................................................ 523/156
See application file for complete search history.

(56) References Cited

U.S. PATENT DOCUMENTS

| | | | |
|---|---|---|---|
| 3,897,405 A * | 7/1975 | Son | C08L 21/00 525/352 |
| 10,717,853 B2 | 7/2020 | Pille-Wolf et al. | |
| 11,649,303 B2 | 5/2023 | Nguyen et al. | |
| 12,006,393 B2 | 6/2024 | Nguyen et al. | |
| 12,043,729 B2 | 7/2024 | Nguyen et al. | |
| 2004/0249085 A1 | 12/2004 | Waddell et al. | |
| 2021/0017369 A1 | 1/2021 | Blok et al. | |
| 2021/0024668 A1 | 1/2021 | Blok et al. | |
| 2021/0024725 A1 | 1/2021 | Blok et al. | |
| 2021/0032389 A1 | 2/2021 | Blok et al. | |

FOREIGN PATENT DOCUMENTS

| | | | | |
|---|---|---|---|---|
| WO | WO-0248257 A2 * | 6/2002 | ........... | B60C 1/0025 |
| WO | WO-2016053541 A1 * | 4/2016 | ............... | B60C 1/00 |

OTHER PUBLICATIONS

Kolbert et al., "Determination of Monomer Sequence Distribution in EPDM by $^{13}C$ NMR: Third Monomer Effects", Journal of Applied Polymer Science, vol. 71, pp. 523-530 (1999).
Van der Veldon, "$^{13}C$ NMR Study of the Nonconjugated Diene Incorporated in Ethylene-Propylene Terpolymers", Macromolecules, vol. 16, pp. 85-89 (1983).
Chinese Office Action dated Apr. 5, 2024: Search Report.

* cited by examiner

*Primary Examiner* — Deve V Hall
(74) *Attorney, Agent, or Firm* — ExxonMobil Technology and Engineering Company

(57) ABSTRACT

An elastomeric composition is disclosed. The elastomeric composition includes, per 100 parts by weight of rubber (phr): about 5 to about 40 phr of styrene/butadiene copolymer; about 60 to about 100 phr of natural rubber or polyisoprene; a curative agent; an antioxidant; about 1 to about 20 phr carbon black; about 5 to about 40 phr plasticizing agent; about 40 to about 80 phr silica; about 1 to about 20 phr silane coupling agent and about 5 to about 30 phr of a polymer selected from the group consisting of ethylene-propylene-diene terpolymer, butyl rubber, poly(isobutylene-co-para-methylstyrene) and poly(isobutylene-co-para-methylstyrene-co-isoprene) terpolymer. The polymer based on ethylene-propylene-diene terpolymer, butyl rubber, poly (isobutylene-co-para-methylstyrene) and poly(isobutylene-co-para-methylstyrene-co-isoprene) terpolymer may be functionalized.

25 Claims, 10 Drawing Sheets

US 12,459,295 B2

FUNCTIONALIZED POLYMERS TREAD ADDITIVE TO IMPROVE TIRE PERFORMANCE FOR IMMISCIBLE ALL-SEASON TREAD

CROSS-REFERENCE TO RELATED APPLICATIONS

This application is a U.S. national phase application of PCT Application No. PCT/US2020/064007 having a filing date of Dec. 9, 2020, which claims priority to and the benefit of U.S. Provisional Application Ser. No. 62/949,151 having a filing date of Dec. 17, 2019, the contents of both of which are incorporated by reference in their entirety. This invention is related to concurrently filed U.S. Ser. No. 62/949,088 entitled "FUNCTIONALIZED POLYMERS TREAD ADDITIVE FOR IMPROVED WET BRAKING AND ROLLING RESISTANCE IN HIGH SILICA SUMMER TIRE," U.S. Ser. No. 62/949,116 entitled "FUNCTIONALIZED POLYMERS TREAD ADDITIVE FOR IMPROVED WET BRAKING AND ROLLING RESISTANCE IN LOW SILICA SUMMER TIRE," U.S. Ser. No. 62/949,127 entitled "FUNCTIONALIZED POLYMERS TREAD ADDITIVE FOR IMPROVED WINTER TIRE PERFORMANCE," U.S. Ser. No. 62/949,186 entitled "FUNCTIONALIZED POLYMERS TREAD ADDITIVE TO IMPROVE TRUCK AND BUS RADIAL TIRE PERFORMANCE," U.S. Ser. No. 62/949,136 entitled "FUNCTIONALIZED POLYMERS TREAD ADDITIVE TO IMPROVE TIRE PERFORMANCE FOR ALL-SEASON TREAD CONTAINING HIGH POLYBUTADIENE LEVEL" and U.S. Ser. No. 62/949,175 "FUNCTIONALIZED POLYMERS TREAD ADDITIVE TO IMPROVE ALL-SEASON TIRE PERFORMANCE," the disclosures of which are incorporated herein by reference.

FIELD OF THE INVENTION

The present invention relates to polymers useful as modifiers for tire treads.

BACKGROUND OF THE INVENTION

The tire tread compound is an important compound in a tire that dictates wear, traction, and rolling resistance. It is a technical challenge to deliver excellent traction, low rolling resistance while providing good tread wear. The challenge lies in the trade-off between wet traction and rolling resistance/tread wear. Raising the compound glass transition temperature (Tg) provides better wet traction but, at the same time, increases the rolling resistance and tread wear. There is still a need to develop a tread compound additive that can provide good wet traction without increasing rolling resistance and tread wear.

Functionalized SBR (styrene butadiene rubber) is one method to improve this trade-off by improving filler dispersion. NANOPRENE™, sub-micron to micron sized gels from Lanxess with cross-linked butadiene cores and acrylic shells, is another additive used to increase the wet traction without affecting rolling resistance. However, Nanoprene can only deliver limited improvement in wet traction.

Related references include PCT Publications WO2019/199833, WO2019/199835, WO2019/199839 and WO2019/199840.

SUMMARY OF THE INVENTION

Described herein is an elastomeric composition comprising, per 100 parts by weight of rubber (phr): about 5 to about 40 phr of styrene/butadiene copolymer; about 60 to about 100 phr of natural rubber or polyisoprene; a curative agent; an antioxidant; about 1 to about 20 phr carbon black; about 5 to about 40 phr plasticizing agent; about 40 to about 80 phr silica; about 1 to about 20 phr silane coupling agent and about 5 to about 30 phr of a polymer selected from the group consisting of ethylene-propylene-diene terpolymer, butyl rubber, poly(isobutylene-co-para-methylstyrene) and poly(isobutylene-co-para-methylstyrene-co-isoprene) terpolymer.

DETAILED DESCRIPTION OF THE INVENTION

Figure 1:
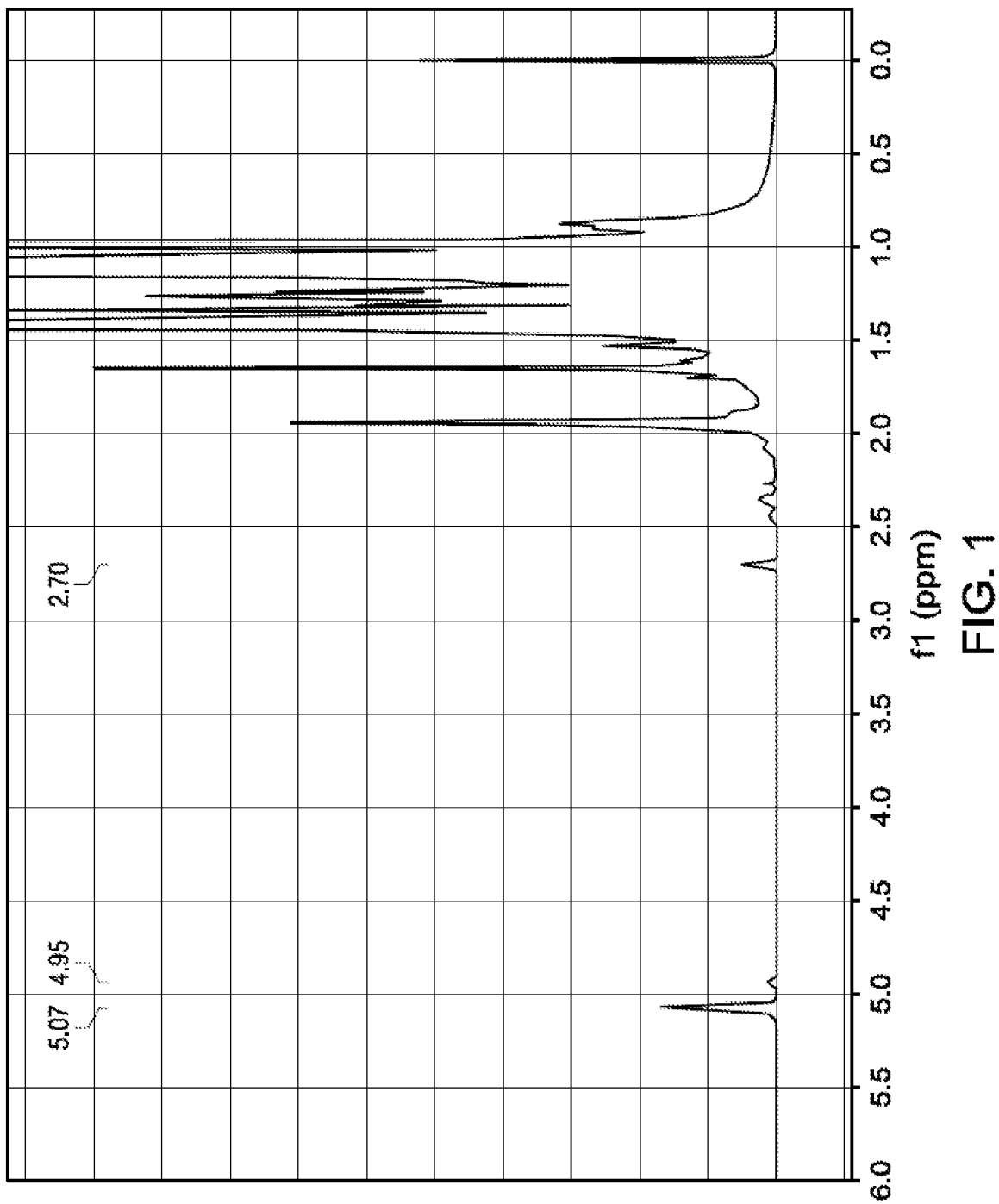
FIG. 1 illustrates a $^1$H-NMR spectra of partially epoxidized butyl rubber obtained via a reactive mixing process.

This invention is directed to the use of polymer additives based on butyl rubber, ethylene-propylene-diene terpolymer, poly(isobutylene-co-para-methylstyrene) polymer and poly(isobutylene-co-para-methylstyrene-co-isoprene) terpolymer. These polymers, which may be functionalized, are useful in tire tread compositions.

It is a technical challenge to deliver excellent traction, low rolling resistance while providing good tread wear. The challenge lies in the trade-off between wet traction and rolling resistance/tread wear. One way to improve rolling resistance and wet braking is to incorporate a series of polyolefin additives based on butyl rubber, ethylene-propylene-diene terpolymer, poly(isobutylene-co-para-methylstyrene) polymer and poly(isobutylene-co-para-methylstyrene-co-isoprene) terpolymer in tire tread compositions.

Development of an immiscible functionalized polyolefin (PO) additive increases hysteresis in the wet traction region (0° C.) and lowers hysteresis in the rolling resistance region (60° C.) without changing the overall compound Tg by improving the interface between the polymer domain and the tread matrix. Without wishing to be bound by any theory, the applicants believe that the addition of the functionalized PO provides a robust interface between the polymer domain and the tread matrix by concentrating the carbon black and antioxidant in the functionalized PO domain to improve abrasion resistance, cure state and UV stability.

In one embodiment, an elastomeric composition comprises, per 100 parts by weight of rubber (phr): about 5 to about 40 phr of styrene/butadiene copolymer; about 60 to about 100 phr of natural rubber or polyisoprene; a curative agent; an antioxidant; about 1 to about 20 phr carbon black; about 5 to about 40 phr plasticizing agent; about 40 to about 80 phr silica; about 1 to about 20 phr silane coupling agent; and about 5 to about 30 phr of a polymer selected from the group consisting of ethylene-propylene-diene terpolymer, butyl rubber, poly(isobutylene-co-para-methylstyrene) and poly(isobutylene-co-para-methylstyrene-co-isoprene) terpolymer.

The butyl copolymer rubbers are prepared by polymerizing (i) C4-C7 isoolefins with (ii) C4-C14 conjugated dienes. The butyl copolymer rubbers contain from 85 to 99.5 mol % C4-C7 isoolefins and from 0.5 to 15 mol % C4-C14 conjugated dienes. Preferably, the butyl copolymer rubber is Butyl 365 (ExxonMobil Chemical). In an embodiment, the butyl copolymer rubbers may be halogenated. Preferably, the halogenated butyl copolymer rubber is Exxon™ bromobutyl rubber or Exxon™ chlorobutyl rubber.

The ethylene-propylene-diene terpolymers are prepared by polymerizing (i) propylene with (ii) at least one of ethylene and $C_4$-$C_{20}$ α-olefins and (iii) one or more dienes such as ethylidene norbornene. In an embodiment, the ethylene-propylene-diene terpolymer may be halogenated. In another embodiment, the ethylene-propylene-diene terpolymer is amorphous ethylene-propylene-diene terpolymer.

The poly(isobutylene-co-para-methylstyrene) polymers (BIMSM) are prepared as described in U.S. Pat. No. 5,162,445. A catalyst solution of ethyl aluminum dichloride in methyl chloride is added to a feed blend of methyl chloride, isobutylene and para-methylstyrene in a reactor. The reactor is quenched by cold methanol, the methyl chloride is flashed off and the BIMSM polymer is washed in methanol. Preferably, the poly(isobutylene-co-para-methylstyrene) polymer is Exxpro™ NPX 1602 (ExxonMobil Chemical). In an embodiment, the poly(isobutylene-co-para-methylstyrene) polymer may be halogenated. Preferably, the halogenated poly(isobutylene-co-para-methylstyrene) polymer is a brominated poly(isobutylene-co-para-methylstyrene) polymer such as Exxpro™ 3035, 3433, 3563 or 3745. In an embodiment, the poly(isobutylene-co-para-methylstyrene) polymer may be functionalized as described in U.S. Pat. No. 5,162,445 or as described herein.

The poly(isobutylene-co-para-methylstyrene-co-isoprene) terpolymers (IB-IP-PMS) are prepared as described in U.S. Pat. No. 6,960,632 or as described herein. Poly(isobutylene-co-para-methylstyrene-co-isoprene) terpolymer is prepared by adding an initiator/co-initiator solution to a mixed para-methyl styrene, isoprene, and isobutylene monomer solution using standard slurry cationic polymerization techniques. In an embodiment, the poly(isobutylene-co-para-methylstyrene-co-isoprene) terpolymer may be halogenated.

The tire tread composition is an important aspect in a tire that dictates wear, traction, and rolling resistance. It is a technical challenge to deliver excellent traction and low rolling resistance while providing good tread wear. The challenge lies in the trade-off between wet traction and rolling resistance/tread wear. Typically, raising the composition's glass transition temperature (Tg) would provide good wet traction but, at the same time, increase the rolling resistance and tread wear. The embodiments described herein, on the other hand, provide a tread compound additive that can deliver superior wet traction without lowering the rolling resistance and tread wear.

The problem has been approached by developing an additive, a polymer that increases hysteresis in the wet traction region (0° C.) and lowers hysteresis in the rolling resistance region (60° C.) without changing the overall compound Tg. The present embodiments described herein overcome one or more of these deficiencies.

The tread compositions described herein is suitable for use in all-season tires. That is, the mechanical properties of the tread compounds indicate that corresponding tires would have enhanced handling (e.g., greater traction and grip) and improved braking capabilities.

Butyl Copolymer Rubber

The term "butyl rubber" or "butyl rubber copolymer" as used in the specification means copolymers of $C_4$ to $C_7$ isoolefins and $C_4$ to $C_{14}$ conjugated dienes which comprise about 0.5 to about 15 mol % conjugated diene and about 85 to 99.5 mol % isoolefin. Illustrative examples of the isoolefins which may be used in the preparation of butyl rubber are isobutylene, 2-methyl-1-propene, 3-methyl-1-butene, 4-methyl-1-pentene and beta-pinene. Illustrative examples of conjugated dienes which may be used in the preparation of butyl rubber are isoprene, butadiene, 2,3-dimethyl butadiene, piperylene, 2,5-dimethylhexa-2,4-diene, cyclopentadiene, cyclohexadiene and methylcyclopentadiene. The preparation of butyl rubber is described in U.S. Pat. No. 2,356,128 and is further described in an article by R. M. Thomas et al. in Ind. & Eng. Chem., vol. 32, pp. 1283 et seq., October, 1940. Butyl rubber generally has a viscosity average molecular weight between about 100,000 to about 1,500,000, preferably about 250,000 to about 800,000 and a Wijs Iodine No. (INOPO) of about 0.5 to 50, preferably 1 to 20 (for a description of the INOPO test, see Industrial and Engineering Chemistry, Vol. 17, p. 367, 1945).

The term "butyl rubber" also encompasses functionalized butyl rubber compounds described herein.

The butyl rubber may have a $C_4$ to $C_7$ isoolefin(s) amount of from about 85 to about 99.5 mol %, or from about 90 to about 99.5 mol % or from about 95 to about 99.5 mol %, based on the weight of the butyl rubber.

The butyl rubber may have a $C_4$ to $C_{14}$ conjugated diene(s) amount of from about 0.5 to about 15 mol %, or from about 0.5 to about 10 mol % or from about 0.5 to about 5 mol %, based on the weight of the butyl rubber.

An example of a butyl rubber is BUTYL 365 or 365S (butyl, isobutylene-isoprene rubber (IIR), available from ExxonMobil Chemical Company). BUTYL 365 or 365S is a copolymer of isobutylene and isoprene with about 2.3 mole % unsaturation. Other examples are Exxon BUTYL 065 or 065S (copolymer of isobutylene and isoprene with about 1.05 mole % unsaturation), Exxon BUTYL 068 (copolymer of isobutylene and isoprene with about 1.15 mole % unsaturation) and Exxon BUTYL 268 or 268S (copolymer of isobutylene and isoprene with about 1.7 mole % unsaturation).

In an embodiment, the butyl copolymer rubber may be halogenated. Preferably, the halogenated butyl copolymer rubber is brominated poly(isobutylene-co-isoprene) or chlorobutyl rubber (CIIR), a terpolymer of isobutylene, isoprene and chlorinated isoprene. Examples of halogenated butyl copolymer rubbers are Exxon™ bromobutyl rubber or Exxon™ chlorobutyl rubber. An example of a brominated butyl copolymer is Bromobutyl 2222 (ExxonMobil Chemical). Another example of a brominated butyl rubber is Exxon SBB 6222 (Exxon Mobil), a brominated star branched butyl rubber. An example of a chlorinated butyl copolymer is Chlorobutyl 1066 and 1068 (ExxonMobil Chemical).

In one embodiment, the butyl rubber is functionalized with sulfur.

In another embodiment, the butyl rubber is functionalized with sulfur and an activator. In a further embodiment, the activator is zinc oxide or stearic acid. In a further embodiment, the activator is a combination of zinc oxide and stearic acid.

In another embodiment, the butyl rubber is functionalized with sulfur, an activator and a silane coupling agent. In a further embodiment, the silane coupling agent is bis(3-triethoxysilylpropyl)tetrasulphide (TESPT) (available as Si69® from Evonik Industries) or bis[3-(diethoxy octyloxysilyepropyl]tetrasulfide (from Shin-Etsu). In a further embodiment, the silane coupling agent is blended with carbon black. An example of a silane coupling agent/carbon black is a 50:50 blend of Si69® and N330 carbon black (available as X50-S® from Evonik Industries) In a further embodiment, the activator is zinc oxide or stearic acid. In a further embodiment, the activator is a combination of zinc oxide and stearic acid.

In another embodiment, the butyl rubber is functionalized with sulfur, a vulcanizing accelerator and a silane coupling agent.

In another embodiment, the butyl rubber is functionalized with sulfur and a vulcanizing accelerator. In a further embodiment, the vulcanizing accelerator is n-tertiary-butyl-2-benzothiazyl sulfenamide (TBBS).

The inventive compositions may include the butyl rubber in an amount of from about 5 phr to about 30 phr, from about 5 phr to about 25 phr or from about 10 to 20 phr.

Ethylene-Propylene-Diene Terpolymer

The "ethylene-propylene-diene terpolymer" as used herein may be any polymer comprising propylene and other comonomers. The term "polymer" refers to any carbon-containing compound having repeat units from one or more different monomers. The term "terpolymer" as used herein refers to a polymer synthesized from three different monomers.

The term "ethylene-propylene-diene terpolymer" also encompasses functionalized ethylene-propylene-diene terpolymer compounds described herein.

Terpolymers, in some embodiments, may be produced (1) by mixing all three monomers at the same time or (2) by sequential introduction of the different comonomers. The mixing of comonomers may be done in one, two, or possible three different reactors in series and/or in parallel. Preferably the ethylene-propylene-diene terpolymer comprises (i) propylene-derived units, (ii) α-olefin-derived units and (iii) diene-derived units. The ethylene-propylene-diene terpolymer may be prepared by polymerizing (i) propylene with (ii) at least one of ethylene and $C_4$-$C_{20}$ α-olefins and (iii) one or more dienes.

The comonomers may be linear or branched. Preferred linear comonomers include ethylene or $C_4$ to $C_8$ α-olefins, more preferably ethylene, 1-butene, 1-hexene, and 1-octene, even more preferably ethylene or 1-butene. Preferred branched comonomers include 4-methyl-1-pentene, 3-methyl-1-pentene, and 3,5,5-trimethyl-1-hexene. In one or more embodiments, the comonomers may include styrene.

The dienes may be conjugated or non-conjugated. Preferably, the dienes are non-conjugated. Illustrative dienes may include, but are not limited to, 5-ethylidene-2-norbornene (ENB); 1,4-hexadiene; 5-methylene-2-norbornene (MNB); 1,6-octadiene; 5-methyl-1,4-hexadiene; 3,7-dimethyl-1,6-octadiene; 1,3-cyclopentadiene; 1,4-cyclohexadiene; vinyl norbornene (VNB); dicyclopendadiene (DCPD); and combinations thereof. Preferably, the diene is ENB or VNB. Preferably, the ethylene-propylene-diene terpolymer comprises an ENB content of from 0.5 wt % to 8 wt % based on the weight of the terpolymer, or from 2 wt % to 6 wt %, or from 3 wt % to 5 wt %. More preferably, the ethylene-propylene-diene terpolymer comprises an ENB content of from 0.5 wt % to 3 wt %.

The ethylene-propylene-diene terpolymer may have a propylene amount of from 65 wt % to 95 wt %, or from 70 wt % to 95 wt %, or from 75 wt % to 95 wt %, or from 80 wt % to 95 wt %, or from 83 wt % to 95 wt %, or from 84 wt % to 95 wt %, or from 84 wt % to 94 wt %, or from 72 wt % to 95 wt %, or from 80 wt % to 93 wt %, or from 85 wt % to 89 wt %, based on the weight of the polymer. The balance of the ethylene-propylene-diene terpolymer comprises at least one of ethylene and $C_4$-$C_{20}$ α-olefin and one or more dienes. The α-olefin may be ethylene, butene, hexane, or octene. When two or more α-olefins are present in the polymer, ethylene and at least one of butene, hexane, or octene are preferred.

Preferably, the ethylene-propylene-diene terpolymer comprises from 2 to 30 wt % of $C_2$ and/or $C_4$-$C_{20}$ α-olefins based the weight of the ethylene-propylene-diene terpolymer. When two or more of ethylene and $C_4$-$C_{20}$ α-olefins are present the combined amounts of these olefins in the polymer is preferably at least 2 wt % and falling within the ranges described herein. Other preferred ranges of the amount of ethylene and/or one or more α-olefins include from 2 wt % to 15 wt %, or from 5 wt % to 15 wt %, or from 8 wt % to 15 wt %, or from 8 to 12 wt %, based on the weight of the ethylene-propylene-diene terpolymer.

Preferably, the ethylene-propylene-diene terpolymer comprises an ethylene content of from 5 wt % to 25 wt % based on the weight of the terpolymer, or from 8 wt % to 12 wt %.

Preferably, the ethylene-propylene-diene terpolymer comprises a diene content of from 1 wt % to 16 wt % based on the weight of the terpolymer, or from 1 wt % to 12 wt %, or 2 wt % to 6 wt %, or from 2 wt % to 6 wt %.

In one embodiment, the ethylene-propylene-diene terpolymer is halogenated. The ethylene-propylene-diene terpolymer may be halogenated by methods known in the art or by methods described in U.S. Pat. No. 4,051,083.

In one embodiment, the synthesis of the ethylene-propylene-diene terpolymer utilizes a bis((4-triethylsilyl)phenyl)methylene(cyclopentadienyl) (2,7-di-tert-butyl-fluoren-9-yl) hafnium dimethyl catalyst precursor. However, other metallocene precursors with good diene incorporation and MW capabilities could also be used. The synthesis of the ethylene-propylene-diene terpolymer also utilizes a dimethylanilinium tetrakis(pentafluorophenyl)borate activator but dimethylanilinium-tetrakis(heptafluoronaphthyl)borate and other non-coordinating anion type activators or MAO could also be used.

In a reactor, a copolymer material is produced in the presence of ethylene, propylene, ethylidene norbornene, and a catalyst comprising the reaction product of N,N-dimethylanilinium tetrakis(pentafluorophenyl)borate and [cyclopentadienyl(2,7-di-t-butylfluorenyl)di-p-triethylsilanephenylmethane] hafnium dimethyl. The copolymer solution emerging from the reactor is quenched and then devolatilized using conventionally known devolatilization methods, such as flashing or liquid phase separation, first by removing the bulk of the isohexane to provide a concentrated solution, and then by stripping the remainder of the solvent in anhydrous conditions using a devolatilizer so as to end up with a molten polymer composition containing less than 0.5 wt % of solvent and other volatiles. The molten polymer composition was advanced by a screw to a pelletizer from which the ethylene-propylene-diene terpolymer composition pellets are submerged in water and cooled until solid.

The ethylene-propylene-diene terpolymer may have a melt flow rate (MFR, 2.16 kg weight at 230° C.), equal to or greater than 0.1 g/10 min as measured according to the ASTM D-1238-13. Preferably, the MFR (2.16 kg at 230° C.) is from 0.5 g/10 min to 200 g/10 min, or from 0.5 g/10 min to 100 g/10 min, or from 0.5 g/10 min to 30 g/10 min, or from 0.5 g/10 min to 10 g/10 min, or from 0.5 g/10 min to 5 g/10 min, or from 0.5 g/10 min to 2 g/10 min, or from 0.1 g/10 min to 15 g/10 min.

The ethylene-propylene-diene terpolymer may have a heat of fusion ($H_f$) determined by the DSC procedure described herein, which is greater than or equal to 0 Joules per gram (J/g), and is equal to or less than 80 J/g, or equal to or less than 75 J/g, or equal to or less than 70 J/g, or equal to or less than 60 J/g, or equal to or less than 50 J/g, or equal to or less than 35 J/g. Preferably, the $H_f$ is 0 J/g.

The crystallinity of the ethylene-propylene-diene terpolymer may be expressed in terms of percentage of crystallinity (i.e., % crystallinity), as determined according to the DSC procedure described herein. The ethylene-propylene-diene terpolymer may have a % crystallinity of from 0% to 40%. Preferably, the % crystallinity is 0%. The ethylene-propylene-diene terpolymer preferably may have a single broad melting transition. However, the ethylene-propylene-diene terpolymer may show secondary melting peaks adjacent to the principal peak, but for purposes herein, such secondary melting peaks are considered together as a single melting point, with the highest of these peaks (relative to baseline as described herein) being considered as the melting point of the ethylene-propylene-diene terpolymer.

The Differential Scanning calorimetry (DSC) procedure may be used to determine heat of fusion and melting temperature of the ethylene-propylene-diene terpolymer. The method is as follows: approximately 6 mg of material placed in microliter aluminum sample pan. The sample is placed in a Differential Scanning calorimeter (Perkin Elmer Pyris 1 Thermal Analysis System) and is cooled to −80° C. The sample is heated at 10° C./min to attain a final temperature of 120° C. The sample is cycled twice. The thermal output, recorded as the area under the melting peak of the sample, is a measure of the heat of fusion and may be expressed in Joules per gram of polymer and is automatically calculated by the Perkin Elmer System. The melting point is recorded as the temperature of the greatest heat absorption within the range of melting of the sample relative to a baseline measurement for the increasing heat capacity of the polymer as a function of temperature.

The ethylene-propylene-diene terpolymer may be a blend of discrete random ethylene-propylene-diene terpolymers as long as the polymer blend has the properties of the ethylene-propylene-diene terpolymer as described herein. The number of ethylene-propylene-diene terpolymers may be three or less, or two or less. In one or more embodiments, the ethylene-propylene-diene terpolymer may include a blend of two ethylene-propylene-diene terpolymers differing in the olefin content, the diene content, or the both.

In one embodiment, the ethylene-propylene-diene terpolymer is functionalized with sulfur.

In another embodiment, the ethylene-propylene-diene terpolymer is functionalized with sulfur and an activator. In a further embodiment, the activator is zinc oxide or stearic acid. In a further embodiment, the activator is a combination of zinc oxide and stearic acid.

In another embodiment, the ethylene-propylene-diene terpolymer is functionalized with sulfur, an activator and a silane coupling agent. In a further embodiment, the silane coupling agent is bis(3-triethoxysilylpropyl)tetrasulphide (TESPT) (available as Si69® from Evonik Industries) or bis[3-(diethoxy octyloxysilyl)propyl]tetrasulfide (from Shin-Etsu). In a further embodiment, the silane coupling agent is blended with carbon black. An example of a silane coupling agent/carbon black is a 50:50 blend of Si69® and N330 carbon black (available as X50-S® from Evonik Industries) In a further embodiment, the activator is zinc oxide or stearic acid. In a further embodiment, the activator is a combination of zinc oxide and stearic acid.

In another embodiment, the ethylene-propylene-diene terpolymer is functionalized with sulfur, a vulcanizing accelerator and a silane coupling agent.

In another embodiment, the ethylene-propylene-diene terpolymer is functionalized with sulfur and a vulcanizing accelerator. In a further embodiment, the vulcanizing accelerator is n-tertiary-butyl-2-benzothiazyl sulfenamide (TBBS).

The inventive compositions may include the ethylene-propylene-diene terpolymer in an amount of from 5 phr to 30 phr, or from 5 phr to 25 phr, or from 10 phr to 20 phr.

Poly(Isobutylene-Co-Para-Methylstyrene)

The term "poly(isobutylene-co-para-methylstyrene)" as used in the specification means a co-polymer of isobutylene and para-methylstyrene.

The term "poly(isobutylene-co-para-methylstyrene)" also encompasses functionalized poly(isobutylene-co-para-methylstyrene) compounds described herein.

Preferably, the poly(isobutylene-co-para-methylstyrene) polymer is Exxpro™ NPX 1602 (ExxonMobil Chemical). In one embodiment, the poly(isobutylene-co-para-methylstyrene) polymer is halogenated. Brominated poly(isobutylene-co-para-methylstyrene) polymer may be obtained, for example, as Exxpro 3035, 3433, 3563 or 3745, a trademark of the ExxonMobil Chemical Company. Exxpro 3035, 3433, 3563 and 3745 are brominated copolymers of isobutylene and paramethylstyrene containing about 0.47, 0.75, 0.85 and 1.2 mol % benzylic bromine, respectively.

In one embodiment, the poly(isobutylene-co-para-methylstyrene) is functionalized with sulfur.

In another embodiment, the poly(isobutylene-co-para-methylstyrene) is functionalized with sulfur and an activator. In a further embodiment, the activator is zinc oxide or stearic acid. In a further embodiment, the activator is a combination of zinc oxide and stearic acid.

In another embodiment, the poly(isobutylene-co-para-methylstyrene) is functionalized with sulfur, an activator and a silane coupling agent. In a further embodiment, the silane coupling agent is bis(3-triethoxysilylpropyl)tetrasulphide (TESPT) (available as Si69® from Evonik Industries) or bis[3-(diethoxy octyloxysilyl)propyl]tetrasulfide (from Shin-Etsu). In a further embodiment, the silane coupling agent is blended with carbon black. An example of a silane coupling agent/carbon black is a 50:50 blend of Si69® and N330 carbon black (available as X50-S® from Evonik Industries) In a further embodiment, the activator is zinc oxide or stearic acid. In a further embodiment, the activator is a combination of zinc oxide and stearic acid.

In another embodiment, the poly(isobutylene-co-para-methylstyrene) is functionalized with sulfur, a vulcanizing accelerator and a silane coupling agent.

In another embodiment, the poly(isobutylene-co-para-methylstyrene) is functionalized with sulfur and a vulcanizing accelerator. In a further embodiment, the vulcanizing accelerator is n-tertiary-butyl-2-benzothiazyl sulfenamide (TBBS).

The inventive compositions may include the poly(isobutylene-co-para-methylstyrene) polymer in an amount of from about 5 phr to about 30 phr, from about 5 phr to about 25 phr, or from about 10 phr to about 20 phr.

Poly(Isobutylene-Co-Para-Methylstyrene-Co-Isoprene) Terpolymer

The term "poly(isobutylene-co-para-methylstyrene-co-isoprene) terpolymer" as used in the specification means a terpolymer comprising isobutylene, para-methylstyrene and isoprene polymers.

The term "poly(isobutylene-co-para-methylstyrene-co-isoprene) terpolymer" also encompasses functionalized poly(isobutylene-co-para-methylstyrene-co-isoprene) terpolymer compounds described herein.

In one embodiment, the poly(isobutylene-co-para-methylstyrene-co-isoprene) terpolymer contains from 4-8 mol % p-methylstyrene, 0.2-2 mol % isoprene and 90-95 mol % isobutylene based on the terpolymer.

In one embodiment, the poly(isobutylene-co-para-methylstyrene-co-isoprene) terpolymer is functionalized with sulfur.

In another embodiment, the poly(isobutylene-co-para-methylstyrene-co-isoprene) terpolymer is functionalized with sulfur and an activator. In a further embodiment, the activator is zinc oxide or stearic acid. In a further embodiment, the activator is a combination of zinc oxide and stearic acid.

In another embodiment, the poly(isobutylene-co-para-methylstyrene-co-isoprene) terpolymer is functionalized with sulfur, an activator and a silane coupling agent. In a further embodiment, the silane coupling agent is bis(3-triethoxysilylpropyl)tetrasulphide (TESPT) (available as Si69® from Evonik Industries) or bis[3-(diethoxy octyloxysilyepropyl]tetrasulfide (from Shin-Etsu). In a further embodiment, the silane coupling agent is blended with carbon black. An example of a silane coupling agent/carbon black is a 50:50 blend of Si69® and N330 carbon black (available as X50-S® from Evonik Industries) In a further embodiment, the activator is zinc oxide or stearic acid. In a further embodiment, the activator is a combination of zinc oxide and stearic acid.

In another embodiment, the poly(isobutylene-co-para-methylstyrene-co-isoprene) terpolymer is functionalized with sulfur, a vulcanizing accelerator and a silane coupling agent.

In another embodiment, the poly(isobutylene-co-para-methylstyrene-co-isoprene) terpolymer is functionalized with sulfur and a vulcanizing accelerator. In a further embodiment, the vulcanizing accelerator is n-tertiary-butyl-2-benzothiazyl sulfenamide (TBBS).

The inventive compositions may include the poly(isobutylene-co-para-methylstyrene-co-isoprene) terpolymer in an amount of from about 5 phr to about 30 phr, or from about 5 phr to about 25 phr, or from about 10 phr to about 20 phr.

Functionalized Polymer

The term "functionalized polymer" as used in the specification means an olefin polymer which has a functional group, such as an epoxy, thioacetate, mercaptobenzothiazole, amine ionomer, phosphine ionomer or citranellol functional group. Functionalization of a polymer can be implemented as described herein or as known in the art.

In one embodiment, the functionalized polymer has an epoxy, thioacetate, mercaptobenzothiazole, amine ionomer, phosphine ionomer or citranellol functional group.

In a further embodiment, the functionalized polymer has an epoxy functional group. Functionalized polymers with an epoxy functional group can be prepared by adding 3-chloroperbenzoic acid to a polyolefin polymer via a reactive mixing process or by the method described herein. In addition to 3-chloroperbenzoic acid, other oxidizing agents may be hydrogen peroxide or hypochloride in t-butanol. Preferably, the polyolefin polymer is a ethylene-propylene-diene terpolymer, butyl rubber, poly(isobutylene-co-para-methylstyrene) or a poly(isobutylene-co-para-methylstyrene-co-isoprene) terpolymer. In a further embodiment, the epoxy functionalized polymer is epoxidized butyl rubber or epoxidized ethylene-propylene-diene terpolymer. In a further embodiment, the epoxy functionalized polymer is partially epoxidized.

In a further embodiment, the functionalized polymer has a thioacetate functional group. Functionalized polymers with a thioacetate functional group can be prepared by nucleophilic substitution of a polyolefin polymer with potassium thioacetate by a solution or a reactive mixing process. Preferably, the polyolefin polymer is butyl rubber, poly(isobutylene-co-para-methylstyrene) or a poly(isobutylene-co-para-methylstyrene-co-isoprene) terpolymer. In a further embodiment, the thioacetate functionalized polymer is thioacetate functionalized poly(isobutylene-co-para-methylstyrene) or thioacetate functionalized butyl rubber.

In a further embodiment, the functionalized polymer has a mercaptobenzothiazole functional group. Functionalized polymers with a mercaptobenzothiazole functional group can be prepared by reacting tetrabutyl ammonium bromide (TBAB) and sodium mercaptobenzothiazole with a polyolefin polymer by a reactive mixing process. Preferably, the polyolefin polymer is butyl rubber, poly(isobutylene-co-para-methylstyrene) or a poly(isobutylene-co-para-methylstyrene-co-isoprene) terpolymer. In a further embodiment, the mercaptobenzothiazole functionalized polymer is mercaptobenzothiazole functionalized poly(isobutylene-co-para-methylstyrene).

In a further embodiment, the functionalized polymer has an amine ionomer functional group. Functionalized polymers with an amine ionomer functional group can be prepared by reacting dimethylsoyaalkylamine with a polyolefin polymer by a reactive mixing process or by the method described herein. Preferably, the polyolefin polymer is butyl rubber, poly(isobutylene-co-para-methylstyrene) or a poly(isobutylene-co-para-methylstyrene-co-isoprene) terpolymer. In a further embodiment, the amine ionomer functionalized polymer is partially functionalized. In a further embodiment, the amine ionomer functionalized polymer is modified BIMSM-amine ionomer or modified butyl-amine ionomer.

In a further embodiment, the functionalized polymer has a phosphine ionomer functional group. Functionalized polymers with a phosphine ionomer functional group can be prepared by reacting diphenyldiphosphino styrene with a polyolefin polymer by a reactive mixing process. Preferably, the polyolefin polymer is butyl rubber, poly(isobutylene-co-para-methylstyrene) or a poly(isobutylene-co-para-methylstyrene-co-isoprene) terpolymer. In a further embodiment, the phosphine ionomer functionalized polymer is partially functionalized. In a further embodiment, the phosphine ionomer functionalized polymer is modified BIMSM-phosphine ionomer or modified butyl-phosphine ionomer.

In a further embodiment, the functionalized polymer has a citranellol functional group. Functionalized polymers with a citranellol functional group can be prepared by nucleophilic substitution of a polyolefin polymer with citronellol in a catalyst slurry/sodium alkoxide of sodium hydride by a solution process. Preferably, the polyolefin polymer is butyl rubber, poly(isobutylene-co-para-methylstyrene) or a poly(isobutylene-co-para-methylstyrene-co-isoprene) terpolymer. In a further embodiment, the citranellol functionalized polymer is a modified poly(isobutylene-co-para-methylstyrene) containing citranellol side chain substituents.

In a further embodiment, when the polymer is ethylene-propylene-diene terpolymer or butyl rubber, the functionalized polymer has an epoxy, thioacetate, mercaptobenzothiazole, amine ionomer or phosphine ionomer functional group.

In a further embodiment, when the polymer is poly(isobutylene-co-para-methylstyrene) or a poly(isobutylene-co-para-methylstyrene-co-isoprene) terpolymer, the functionalized polymer has a thioacetate, mercaptobenzothiazole, amine ionomer, phosphine ionomer or citranellol functional group.

In a further embodiment, the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is functionalized with sulfur.

In another embodiment, the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is functionalized with sulfur and an activator. In a further embodiment, the activator is zinc oxide or stearic acid. In a further embodiment, the activator is a combination of zinc oxide and stearic acid.

In another embodiment, the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is functionalized with sulfur, an activator and a silane coupling agent.

In another embodiment, the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is functionalized with sulfur, a vulcanizing accelerator and a silane coupling agent.

In another embodiment, the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is functionalized with sulfur and a vulcanizing accelerator.

Elastomers

The inventive tire tread compositions also comprise an elastomer. Generally the range of the elastomer is from 5 to 75% by weight of the tire tread composition. Suitable elastomers include, for example, diene elastomers.

"Diene elastomer" is understood to mean, in known manner, an elastomer resulting at least in part (homopolymer or copolymer) from diene monomers (monomers bearing two double carbon-carbon bonds, whether conjugated or not).

A diene elastomer can be "highly unsaturated," resulting from conjugated diene monomers, which have a greater than 50% molar content of units. In one embodiment, the diene elastomer is selected from the group consisting of styrene-butadiene copolymers, natural rubber or polyisoprene, synthetic polyisoprenes having a cis-1,4 linkage content greater than 95% and a mixture of these elastomers. In one aspect, the composition comprises a blend of styrene/butadiene copolymer (SBR) with at least one of the natural or synthetic polyisoprenes (having a cis-1,4 linkage content greater than 95%).

These diene elastomers can be classified into two categories: "essentially unsaturated" or "essentially saturated". The term "essentially unsaturated" is understood to mean generally a diene elastomer resulting at least in part from conjugated diene monomers having a level of units of diene origin (conjugated dienes) which is greater than 15% (mol %); thus it is that diene elastomers such as butyl rubbers or copolymers of dienes and of alpha-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being used herein is understood more particularly to mean: (a) any homopolymer obtained by polymerization of a conjugated diene monomer having from 4 to 12 carbon atoms; (b) any copolymer obtained by copolymerization of one or more conjugated dienes with one another or with one or more vinylaromatic compounds having from 8 to 20 carbon atoms; (c) a ternary copolymer obtained by copolymerization of ethylene and of an alpha-olefin having 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene; (d) a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise from 99% to 20% by weight of diene units and from 1% to 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. Mention may be made, for coupling to carbon black, for example, of functional groups comprising a C—Sn bond or aminated functional groups, such as benzophenone, for example; mention may be made, for coupling to a reinforcing inorganic filler, such as silica, of, for example, silanol or polysiloxane functional groups having a silanol ends, alkoxysilane groups, carboxyl groups, or polyether groups.

The following are suitable: polyisoprenes, butadiene/styrene copolymers, a styrene content of from 5% to 60% by weight and more particularly from 20% to 50%, a content (molar %) of 1,2-bonds of the butadiene part of from 4% to 75% and a content (molar %) of trans-1,4-bonds of from 10% to 80%, butadiene/isoprene copolymers, in particular those having an isoprene content of from 5% to 90% by weight, or isoprene/styrene copolymers, in particular those having a styrene content of from 5% to 50% by weight. In the case of butadiene/styrene/isoprene copolymers, those having a styrene content of from 5% to 50% by weight and more particularly of from 10% to 40%, an isoprene content of from 15% to 60% by weight and more particularly from 20% to 50%, a butadiene content of from 5% to 50% by weight and more particularly of from 20% to 40%, a content (molar %) of 1,2-units of the butadiene part of from 4% to 85%, a content (molar %) of trans-1,4-units of the butadiene part of from 6% to 80%, a content (molar %) of 1,2- plus 3,4-units of the isoprene part of from 5% to 70% and a content (molar %) of trans-1,4-units of the isoprene part of from 10% to 50%, and more generally any butadiene/styrene/isoprene copolymer.

The diene elastomer chosen from the group of the highly unsaturated diene elastomers consisting of synthetic polyisoprenes (IR), natural rubber (NR), butadiene copolymers, isoprene copolymers and the mixtures of these elastomers. Such copolymers are more preferably chosen from the group consisting of butadiene/styrene copolymers (SBR), isoprene/butadiene copolymers (BIR), isoprene/styrene copolymers (SIR) and isoprene/butadiene/styrene copolymers (SBIR).

The SBR may be prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of from 20% to 35% by weight, or a high styrene content, for example from 35 to 45%, a content of vinyl bonds of the butadiene part of from 15% to 70%, a content (molar %) of trans-1, 4-bonds of from 15% to 75% and a Tg of from −10° C. to −55° C.

An example of a SBR is SPRINTAN® SLR-4602, a partially coupled functionalized SBR. Another example of a styrene/butadiene copolymer is Tufdene E680 solution polymerized styrene-butadiene rubber, 34% styrene percent and 58% vinyl 1,2-content based on its polybutadiene portion, 37.5 phr SRAE oil from Asahi Chemical.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber IM), isoprene/styrene copolymers (SIR), isoprene/butadiene copolymers (BIR) or isoprene/butadiene/styrene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%. One example of a natural rubber is SVR 3 CV60 available from Standard Vietnamese Rubber CV 60. Another example of a natural rubber is SIR 10 (Standard Indonesian Rubber).

The compositions described herein can comprise a single diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

Useful tire tread compositions can comprise, per 100 parts by weight of rubber (phr), about 5 to about 40 phr of styrene/butadiene copolymer; about 60 to about 100 phr of natural rubber or polyisoprene; a curative agent; an antioxidant; about 1 to about 20 phr carbon black; about 5 to about 40 phr plasticizing agent; about 40 to about 80 phr silica; about 1 to about 20 phr silane coupling agent and about 5 to about 30 phr of a polymer selected from the group consisting of ethylene-propylene-diene terpolymer, butyl rubber, poly (isobutylene-co-para-methylstyrene) and poly(isobutylene-co-para-methylstyrene-co-isoprene) terpolymer.

In an embodiment, the elastomeric composition of the present invention does not contain polybutadiene having a cis-1,4 linkage content of at least 95%.

Inorganic Fillers

The term "filler" as used herein refers to any material that is used to reinforce or modify physical properties, impart certain processing properties, or reduce cost of an elastomeric composition.

Examples of preferred filler include, but are not limited to, calcium carbonate, clay, mica, silica, silicates, talc, titanium dioxide, alumina, zinc oxide, starch, wood flour, carbon black, or mixtures thereof. The fillers may be any size and range, for example in the tire industry, from 0.0001 μm to 100 μm.

As used herein, the term "silica" is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica. A preferred filler is commercially available by Rhodia Company under the trade name ZEOSIL™ Z1165 or ZEOSIL™ 1165 MP.

In one embodiment, the elastomeric composition comprises, per 100 parts by weight of rubber (phr), about 1 to 20 phr carbon black filler. In a further embodiment, the elastomeric composition comprises about 1 to 15 phr carbon black.

In another embodiment, the elastomeric composition comprises, per 100 parts by weight of rubber (phr), about 40 to 80 phr silica filler. In a further embodiment, the elastomeric composition comprises about 50 to 70 phr silica filler.

Use may be made of any type of reinforcing filler known for its capabilities of reinforcing a rubber composition which can be used for the manufacture of tires, for example an organic filler, such as carbon black, a reinforcing inorganic filler, such as silica, or a blend of these two types of filler, in particular a blend of carbon black and silica. In a further embodiment, the elastomeric composition of the present invention comprises a filler blend of carbon black and silica.

All carbon blacks, in particular blacks of the HAF, ISAF or SAF type, conventionally used in tires ("tire-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, the blacks of higher series (for example, N660, N683 or N772). The carbon blacks might, for example, be already incorporated into the isoprene elastomer in the form of a masterbatch (see, for example, International Applications WO 97/36724 or WO 99/16600). Preferably, the carbon black is Vulcan®3 N330 from Cabot Corp. or Vulcan 7H N234 from Cabot Corp.

The term "reinforcing inorganic filler" should be understood, in the present patent application, by definition, as meaning any inorganic or mineral filler, whatever its color and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible ("HDS") precipitated silicas, for example, of the ULTRASIL™ 7000 and ULTRASIL™ 7005 silicas from Degussa, the ZEOSIL™ 1165 MP, C5 MP and 1115 MP silicas from Rhodia, the HI-SIL™ EZ150G silica from PPG, the Zeopol 8715, 8745 and 8755 silicas from Huber or silicas with a high specific surface.

In one embodiment, the silica is alone or a combination of silica compounds. In another embodiment, the silica is not a combination of silica compounds. In another embodiment, when the silica is a combination of silica compounds, one of the silica compounds has a BET surface of from 110 to 175 $m^2/g$.

Mention may also be made, as other examples of inorganic filler being capable of being used, of reinforcing aluminum (oxide), hydroxides, titanium oxides or silicon carbides (see, for example, International Application No. WO 02/053634 or U.S. Publication No. 2004/0030017).

In one embodiment, the composition of the present invention does not contain the inorganic filler magnesium sulphate.

When the compositions of the invention are intended for tire treads with a low rolling resistance, the reinforcing inorganic filler is silica, preferably with a BET surface of from 45 to 400 $m^2/g$, more preferably of from 60 to 300 $m^2/g$. In one embodiment, the silica has a BET surface of from 110 to 175 $m^2/g$.

Coupling Agent

As used herein, the term "coupling agent" is meant to refer to any agent capable of facilitating stable chemical and/or physical interaction between two otherwise non-interacting species, e.g., between a filler and a diene elastomer. Coupling agents cause silica to have a reinforcing effect on the rubber. Such coupling agents may be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

The coupling agent may be a sulfur-based coupling agent, an organic peroxide-based coupling agent, an inorganic coupling agent, a polyamine coupling agent, a resin coupling agent, a sulfur compound-based coupling agent, oxime-nitrosamine-based coupling agent, and sulfur. Among these, preferred for a rubber composition for tires is the sulfur-based coupling agent.

In an embodiment, the coupling agent is at least bifunctional. Non-limiting examples of bifunctional coupling agents include organosilanes or polyorganosiloxanes. Other examples of suitable coupling agents include silane polysulfides, referred to as "symmetrical" or "unsymmetrical" depending on their specific structure. Silane polysulphides can be described by the formula (V):

$$Z\text{-}A\text{-}S_x\text{-}A\text{-}Z \qquad (V),$$

in which x is an integer from 2 to 8 (preferably from 2 to 5); the A symbols, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular $C_1$-$C_4$, alkylene, especially propylene); the Z symbols, which are identical or different, correspond to one of the three formulae (VI):

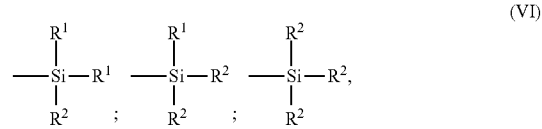

in which the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably $C_1$-$C_6$ alkyl, cyclohexyl or phenyl groups, in particular $C_1$-$C_4$ alkyl groups, more particularly methyl and/or ethyl); the $R^2$ radicals, which are substituted or unsubstituted and identical to or different from one another, represent a $C_1$-$C_{18}$ alkoxyl or $C_5$-$C_{18}$ cycloalkoxyl group (preferably a group selected from $C_1$-$C_8$ alkoxyls and $C_5$-$C_8$ cycloalkoxyls, more preferably still a group selected from $C_1$-$C_4$ alkoxyls, in particular methoxyl and ethoxyl).

Non-limiting examples of silane polysulphides include bis(($C_1$-$C_4$)alkoxy($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)poly sulphides. Further examples include bis(3-triethoxysilylpropyl)tetrasulphide (TESPT) of formula $[(C_2H_5O)_3Si(CH_2)_3S_2]_2$, or bis(triethoxysilylpropyl)disulphide (TESPD) of formula $[(C_2H_5O)_3Si(CH_2)_3S]_2$. Other examples include bis (mono($C_1$-$C_4$)alkoxyldi($C_1$-$C_4$) alkylsilylpropyl)polysulphides (in particular disulphides, trisulphides or tetrasulphides), more particularly bis(monoethoxydimethylsilylpropyl)tetrasulphide. Examples of silane coupling agents are TESPT (Si69® from Evonik Industries) and bis[3-(diethoxy octyloxysilyepropyl]tetrasulfide (an experimental product from Shin-Etsu).

The coupling agent can also be bifunctional POSs (polyorganosiloxanes), or hydroxysilane polysulphides, or silanes or POSs bearing azodicarbonyl functional groups. The coupling agent can also include other silane sulphides, for example, silanes having at least one thiol (—SH) functional group (referred to as mercaptosilanes) and/or at least one masked thiol functional group.

The coupling agent can also include combinations of one or more coupling agents such as those described herein, or otherwise known in the art. A preferred coupling agent comprises alkoxysilane or polysulphurized alkoxysilane. A particularly preferred polysulphurized alkoxysilane is bis (triethoxysilylpropyl) tetrasulphide, which is commercially available by Degussa under the trade name X50S™.

In one embodiment, the polymer selected from the group consisting of ethylene-propylene-diene terpolymer, butyl rubber, poly(isobutylene-co-para-methylstyrene) and poly (isobutylene-co-para-methylstyrene-co-isoprene) terpolymer is functionalized with sulfur and a silane coupling agent. In a further embodiment, the silane coupling agent is selected from the group consisting of triethoxysilylpropyl) tetrasulphide, bis[3-(diethoxy octyloxysilyepropyl]tetrasulfide and bis(triethoxysilylpropyl) tetrasulphide. In another embodiment, the silane coupling agent is a 50:50 blend of bis(3-triethoxysilylpropyl)tetrasulphide (TESPT) and N330 carbon black (available as X50-S® from Evonik Industries).

Plasticizer

As used herein, the term "plasticizer" or "plasticizing agent" includes a petroleum derived processing oil and synthetic plasticizer. Such oils are primarily used to improve the processability of the composition. Suitable plasticizers include, but are not limited to, aliphatic acid esters or hydrocarbon plasticizer oils such as paraffinic oils, aromatic oils, naphthenic petroleum oils, and polybutene oils. A particularly preferred plasticizer is naphthenic oil, which is commercially available from Nynas under the trade name NYTEX™ 4700.

MES and TDAE oils are well known to a person skilled in the art; for example, reference is made to publication KGK (Kautschuk Gummi Kunstoffe), 52nd year, No. 12/99, pp. 799-805, entitled "Safe Process Oils for Tires with Low Environmental Impact".

Mention may be made, as examples of MES oils (whether they are of the "extracted" or "hydrotreated" type) or of TDAE oils, for example, of the products sold under the names FLEXON™ 683 by ExxonMobil, VIVATEC™ 200 or VIVATEC™ 500 by H&R European, PLAXOLENE™ MS by Total, or CATENEX™ SNR by Shell.

The resins (it should be remembered that the term "resin" is reserved by definition for a solid compound) formed of $C_5$ fraction/vinylaromatic copolymer, in particular of $C_5$ fraction/styrene or $C_5$ fraction/$C_9$ fraction copolymer, are well known; they have been essentially used to date for application as tackifying agents for adhesives and paints but also as processing aids in tire rubber compositions. An example of a hydrocarbon resin is Oppera™. PR373 from ExxonMobil Chemical Co. Another example of a hydrocarbon resin is Escorez™ E5320 from ExxonMobil Chemical Co.

In one embodiment, the elastomeric composition of the present invention comprises about 5 to about 40 phr plasticizing agent. In another embodiment, the elastomeric composition of the present invention comprises about 5 to about 25 phr plasticizing agent. In a further embodiment, the plasticizing agent is a petroleum derived processing oil or a hydrocarbon resin. In a further embodiment, the plasticizing agent is a hydrocarbon resin.

Other suitable plasticizers for use in the present invention include "triesters" or "fatty acids." Triester and fatty acid generally refer to a mixture of triesters or a mixture of fatty acids, respectively. The fatty acid preferably consists of more than 50%, more preferably to more than 80% by weight of an unsaturated C18 fatty acid, that is to say one selected from among the group consisting of oleic acid, linoleic acid, linolenic acid and mixtures thereof. More preferably, be it synthetic or natural in origin, the fatty acid used is constituted to more than 50% by weight, more preferably still to more than 80% by weight, of oleic acid.

Antidegradants

Antidegradants encompass antioxidants, antiozonants and waxes. Antiozonanats are used to protect rubber products from ozone. Waxes are also used to provide rubber ozone protection. An example of an antiozone wax is AKRO-WAX™ 5084 from AkroChem.

As used herein, the term "antioxidant" refers to a chemical that combats oxidative degradation. Suitable antioxidants include diphenyl-p-phenylenediamine and those disclosed in *The Vanderbilt Rubber Handbook* (1978), Pages 344 to 346. A particularly preferred antioxidant is para-phenylenediamines, which is commercially available from Flexsys under the trade name SANTOFLEX™ 6 PPD (N-(1,3-Dimethylbutyl)-N'-phenyl-1,4-phenylenediamine) Another preferred antioxidant is a high-molecular-weight, hindered amine light stabilizer, which is commercially available as CHIMASSORB® 2020 from BASF Corp, Crosslinking Agents, Curatives, Cure Packages, and Curing Processes The elastomeric compositions and the articles made from those elastomeric compositions described herein are generally manufactured with the aid of at least one cure package, at least one curative, at least one vulcanizing or crosslinking agent, and/or undergo a process to cure the elastomeric composition. As used herein, at least one curative package refers to any material or method capable of imparting cured properties to a rubber as is commonly understood in the industry. Preferred crosslinking agents are sulfur, sulfur halides, organic peroxides, quinone dioximes, organic polyvalent amine compounds, methylol group-containing alkylphenol resins and the like are mentioned. A preferred crosslinking agent is sulfur. The amount of sulfur to be blended is preferably from 0.1 to 5 parts by mass and more preferably from 0.5 to 3 parts by mass based on 100 parts by mass of the total of the polymer components contained in the polymer composition.

The sulfur may be provided either as free sulfur, through a sulfur donor or combinations thereof. Suitable free sulfur includes, for example, pulverized sulfur, rubber maker's sulfur, commercial sulfur, and insoluble sulfur. A source of free sulfur is super fine sulfur available from Rubbermakers (Harwick Standard Distribution Corp.).

Examples of sulfur donors are amine disulfides, tetramethyl thiuram disulfide (Akrochem TMTD), 4,4'-dithiodimorpholine (Akrochem DTDM), dipentamethylene thiuram tetrasulfide (Akrochem DPTT) and thiocarbamyl sulfonamide (Akrochem Cure-Rite 18).

In an embodiment, the elastomeric compositions of the present invention comprise sulfur functionalized polymers, wherein the polymers are functionalized with sulfur and an activator. In another embodiment, the sulfur functionalized polymers are functionalized with sulfur, an activator and a silane coupling agent. In another embodiment, the sulfur functionalized polymers are functionalized with sulfur, a vulcanizing accelerator and a silane coupling agent. In another embodiment, the sulfur functionalized polymers are functionalized with sulfur and a vulcanizing accelerator.

The cure package may also contain various chemicals, additives, and the like which are commonly used in the rubber industry, as desired. Examples of such chemicals or additives include vulcanizing aids, processing aids, vulcanizing accelerators, process oils, anti-aging agents, anti-scorching agents, zinc oxide, stearic acid, and the like. In one embodiment, zinc oxide is in naphthenic oil such as AKRO-ZINC® BAR 85 available from Akrochem Corp.

Examples of vulcanizing accelerators are sulfenamide-based, guanidine-based, thiuram-based, thiourea-based, benzothiazole-based, dithiocarbamic acid-based, and xanthogenic acid-based compounds, and preferably include 2-mercaptobenzothiazole, dibenzothiazyl disulfide, N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide, diphenylguanidine, diorthotolylguanidine, orthotolylbisguanidine, and the like. Examples of guanidine-based vulcanizing accelerators are diphenylguanidine (DPG), diorthotolylguanidine (DOTG) and orthotolylbisguanidine.

Examples of dithiocarbamic acid-based vulcanizing accelerators are tetramethylthiuram monosulfide (TMTM), tetramethylthiuram disulfide (TMTD) and zinc diethylthiocarbamate (ZDEC). Examples of sulfenamide-based vulcanizing accelerators are N-cyclohexyl-2-benzothiazylsulfenamide (CBS), N-t-butyl-2-benzothiazolesulfenamide (TBBS), N-oxyethylene-2-benzothiazolesulfenamide, N-oxyethylene-2-benzothiazolesulfenamide, N,N'-diisopropyl-2-benzothiazolesulfenamide, 2-morpholinothiobenzothiazole (MBS) and N-dicyclohexylbenzothiazole-2-sulfenamide (DCBS). Examples of benzothiazole-based vulcanizing accelerators are 2-mercaptobenzothiazole (MBT), dibenzothiazyl disulfide and 2,2'-dithiobisbenzothiazole (MBTS).

Preferably, the vulcanizing accelerator is N-cyclohexyl-2-benzothiazylsulfenamide (CBS) available from Kemai Chemical Co. Another preferred vulcanizing accelerator is diphenyl guanidine available as Ekaland DPG from MLPC International (Arkema).

The vulcanizing accelerator may be a single vulcanizing accelerator or a mixture of accelerators. Preferably, the mixture of accelerators is a mixture of different types of accelerators, such as a benzothiazole-based vulcanizing accelerator with a dithiocarbamic acid-based vulcanizing accelerator or a guanidine-based vulcanizing accelerator.

The amount of the vulcanizing accelerator (or mixture thereof) to be blended is usually from 0.1 to 5 parts by mass and preferably from 0.4 to 4 parts by mass based on 100 parts by mass of the total of the polymer components contained in the polymer composition.

Tire Tread Formulations

In one embodiment, a tire tread composition comprises the elastomeric composition described herein. In another embodiment, an article comprises the tire tread composition described herein. In another embodiment, a tread for an all-season tire comprises the tire tread composition described herein.

The tire tread composition has many desirable properties when the functionalized or unfunctionalized polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is present in the elastomeric compositions.

One way of measuring a desirable property of a tread composition is by utilizing the Dynamic Mechanical Thermal Analysis (DMTA) test method. All tire tread compositions were compression molded and cured into pads. Afterward, a rectangular test specimen was cut off from the cured pads and mounted in an ARES G2 (TA instruments) for dynamic mechanical testing in torsion rectangular geometry. A strain sweep at room temperature up to 5.5% strains and at 10 Hz was conducted first, followed by a temperature sweep at 4% strain and 10 Hz from −26° C. to 80° C. with temperature steps of 2° C. Storage and loss moduli are measured along with the loss tangent values. For better wet traction, it is preferred to have higher loss tangent values at a temperatures of 0° C.

As measured by the DMTA test method, the temperature at which the maximum tan delta occurred is recorded is the glass transition temperature, Tg. The maximum Energy Loss (Tangent Delta, wherein the slope is zero) of the immiscible polyolefin domain of the cured composition is at a temperature within the range from about −60 to 20° C.

The various descriptive elements and numerical ranges disclosed herein for the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer, the reactants used to make these polymers, and their use in tire tread compositions can be combined with other descriptive elements and numerical ranges to describe the invention(s); further, for a given element, any upper numerical limit can be combined with any lower numerical limit described herein. The features of the invention are described in the following non-limiting examples.

EXAMPLES

The features of the invention are described in the following non-limiting examples. Preparation of the compounds of Examples 1-10 are described below. However, those skilled in the art will recognize that other procedures can also be suitable.

Example 1. Preparation of Partially (Ca. 20%) Epoxidized Butyl Rubber Via Reactive Mixing Process All mixing experiments were performed in a Brabender Intelli-torque internal mixer using roller type 6 blades. The mixer temperature was set to 70° C. 60 g of Butyl 365 (ExxonMobil Chemical) was fluxed for 30 seconds at 25 rpms, 1.3 g of 3-chloroperbenzoic acid (Aldrich, <77% purity) was added slowly to the mixer. Once addition is complete, the compound was mixed for 10-12 minutes at 60 rpms. The epoxidized Butyl product was removed from the mixer and cooled to room temperature by pressing between two Teflon sheets in a Carver press.

The partially (ca. 20%) epoxidized Butyl product was characterized using proton NMR spectroscopy showing the oxirane proton at 2.7 ppm, and the remaining isoprene olefinic protons at 4.97 and 5.05 ppm.

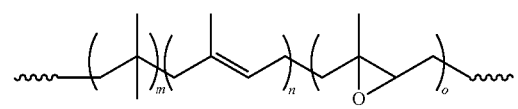

The $^1$H-NMR spectra of the partially epoxidized butyl rubber obtained via reactive mixing (Example 1) is disclosed at FIG. 1.

General $^1$H-NMR Test Method for the Examples on this Invention

In a glass vial, add 50 mg of sample and ~1 mL of 99.8% $CDCl_3$ with 0.03% (v/v) TMS. Place on wrist action shaker until completely dissolved ~2 hours. Transfer the solution to a new NMR tube (using Deuterotubes BORO400-5-7) ensuring that all sample is dissolved and there are no solids remaining. Run the PROTON experiment on the Bruker 500 MHz NMR locked onto $CDCl_3$ as the solvent and using the standard parameters below:

NUC: 1H
DS: 2
NS: 16
TD0: 1
AQ: 3.27 seconds
SW: 19.99 ppm or 10,000 Hz
Zg30 is a 30° pulse; 5 mm probe, 16 scans, is delay, 500 MHz.

Analyze the spectra using MestReNova software. Perform a manual phase correction and baseline correction before integration.

Example 2. Preparation of Partially (Ca. 20%) Epoxidized Ethylene-Propylene-Diene Terpolymer Via a Reactive Mixing Process All mixing experiments were performed in a Brabender Intelli-torque internal mixer using roller type 6 blades. The mixer temperature was set to 70° C. 60 g of ethylene-propylene-diene terpolymer (90.6 wt % C3, 6.9 wt % C2, 2.5 wt % ENB) was fluxed for 30 seconds at 25 rpms, 0.56 g of 3-chloroperbenzoic acid (Aldrich, <77% purity) was added slowly to the mixer. Once addition is complete, the compound was mixed for 10-12 minutes at 60 rpms. The epoxidized ethylene-propylene-diene terpolymer product was removed from the mixer and cooled to room temperature by pressing between two Teflon sheets in a Carver press.

The partially epoxidized (ca. 20%) ethylene-propylene-diene terpolymer product was characterized using proton NMR spectroscopy showing the oxirane proton at 3.09 ppm, and the ENB olefinic protons at 5.21 and 5.01 ppm.

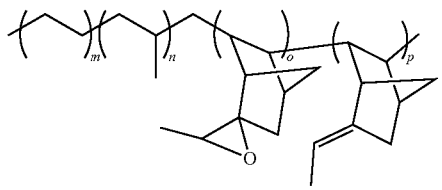

Figure 2:
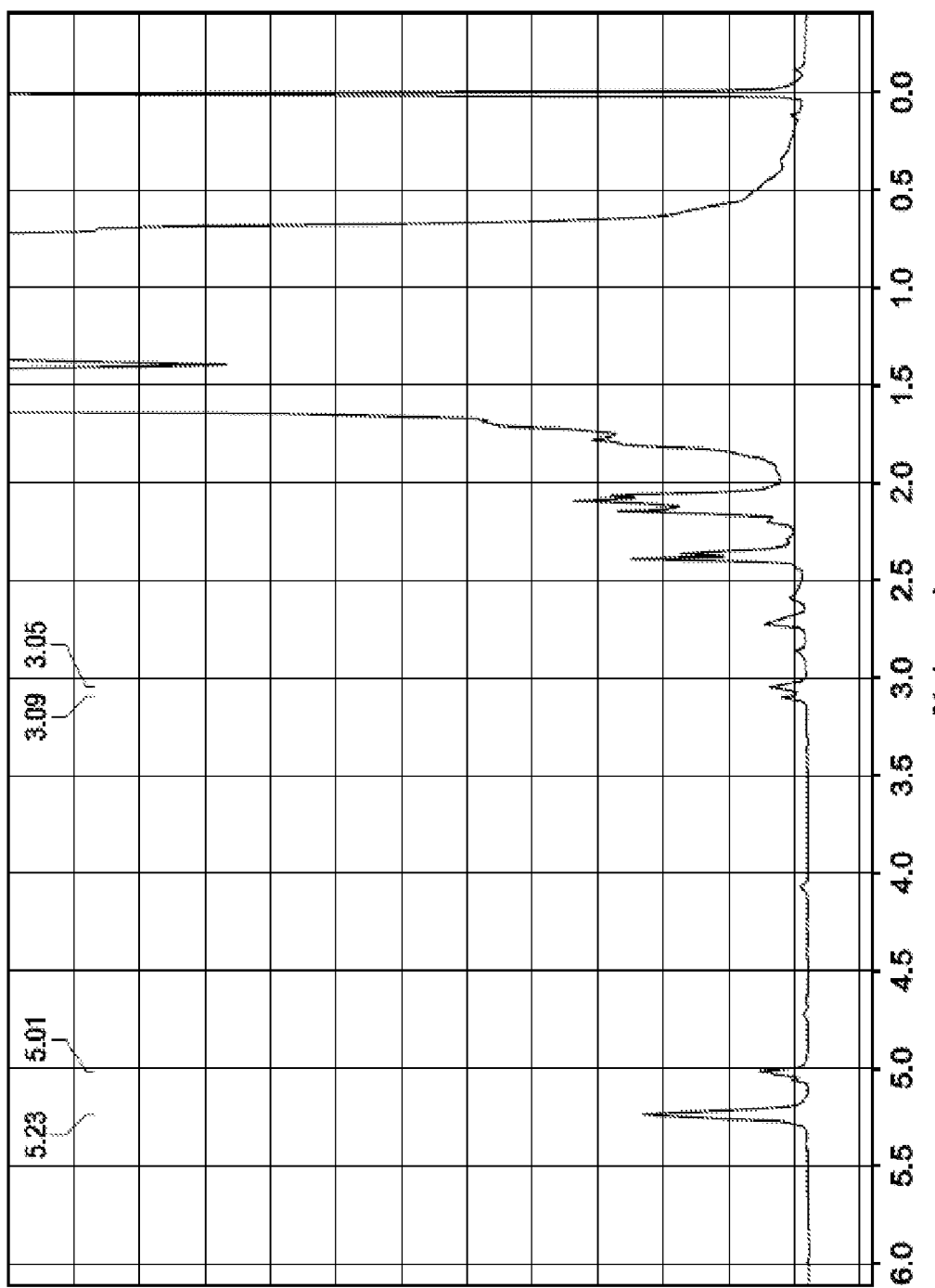
FIG. 2 illustrates a $^1$H-NMR spectra of partially epoxidized ethylene-propylene-diene terpolymer obtained by a reactive mixing process.

The $^1$H-NMR spectra of partially epoxidized ethylene-propylene-diene terpolymer obtained by a reactive mixing process (Example 2) is disclosed at FIG. 2.

Example 3: Preparation of Thioacetate Functionalized Poly(Isobutylene-Co-Para-Methylstyrene) by Solution Process Nucleophilic substitution reaction of potassium thioacetate with Exxpro™ (NPX 1602) was conducted in a 50 L glass reactor equipped with a stirrer and chiller. Dry Tetrahydrofuran (THF) (water ppm≤10 ppm) was prepared by passing 99% THF (Sigma Aldrich) through 3 A molecular sieve. 4000 g of Exxpro™ (Mn=221000 g/mole; 5002 g/mole Br; 0.799 mole) was added to the SOL reactor under nitrogen blanket. The polymer was dissolved in the already prepared dry THF (38 L) at constant stirring at 25° C. for 12 hours or until the polymer is dissolved. A slurry of 2.96 mole (260 g) of potassium thioacetate, was prepare with 1 L of dry THF. The slurry was added to the polymer solution slowly, with constant stirring. The reaction mixture was held at 25° C. for 24 h. At the end of the stipulated time, the reaction mixture is introduced into the quench pot containing 100 L of isopropanol to precipitate the functionalized polymer. The precipitated polymer was re-dissolved in a reactor containing 20 L of isohexane and 2 wt % of Butylated hydroxytoluene (BHT; Sigma Aldrich). The re-dissolved polymer was introduced into the SOL steam stripping pot, connected with a condenser and a chiller. The steam stripping is done using 20 Kg/h of steam under nitrogen blanket. The steam stripped functionalized polymer was finally dried using heated roll mill to obtain 4200 g of functionalized Exxpro™.

The dried polymer was characterized using proton NMR spectroscopy & FTIR. Complete conversion was achieved in 24 h.

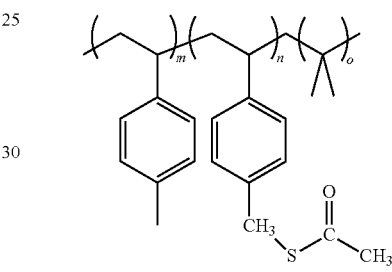

Figure 3:
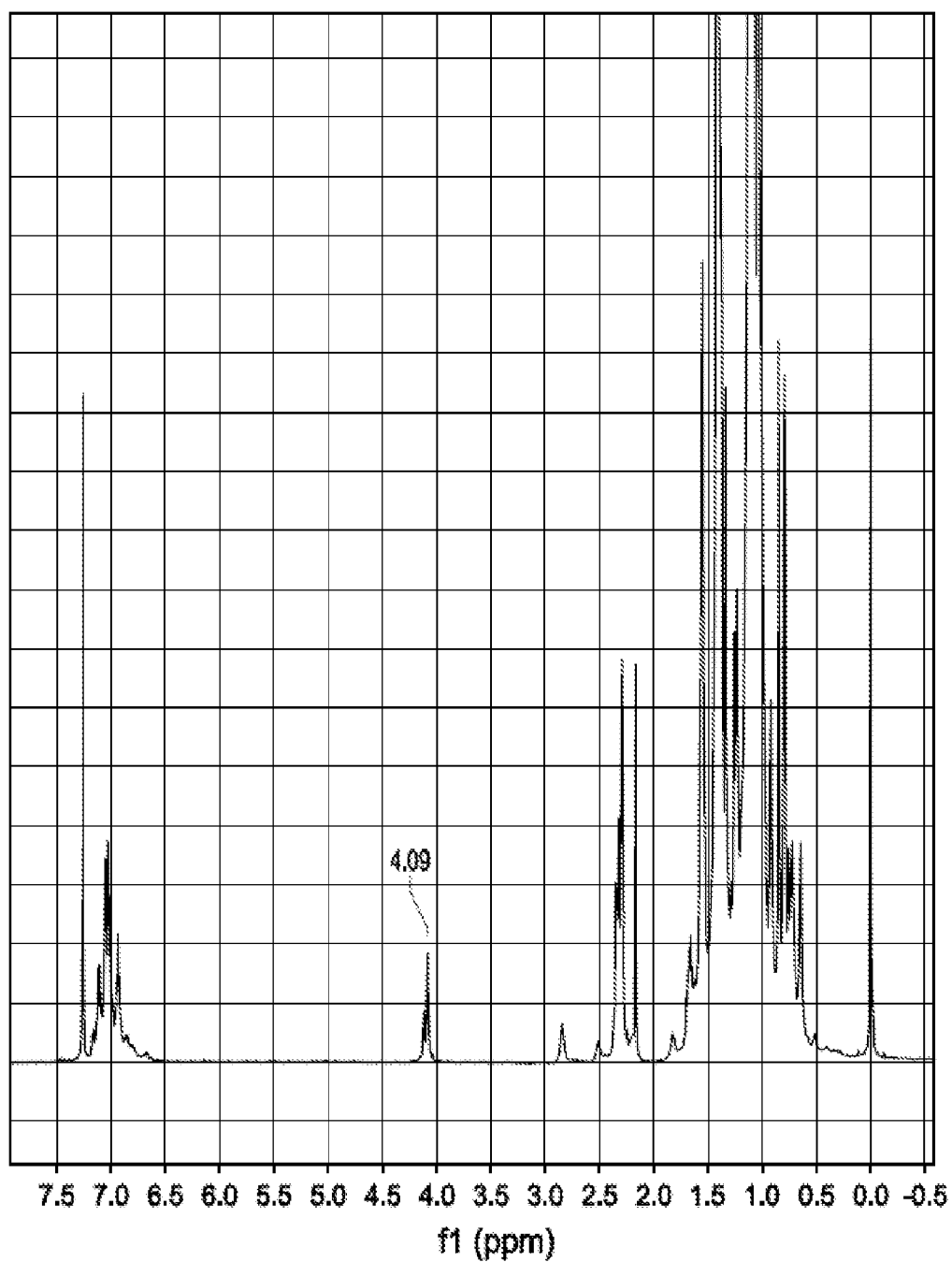
FIG. 3 illustrates a $^1$H-NMR spectra of thioacetate functionalized poly(isobutylene-co-para-methylstyrene) obtained by a solution process.

The thioacetate functionalized poly(isobutylene-co-para-methylstyrene) product was characterized using proton NMR spectroscopy showing complete disappearance of methylene proton (~$CH_2Br$), with new resonance appearing at 4.09 ppm for —$CH_2S$—$COCH_3$ The $^1$H-NMR spectra of the thioacetate functionalized poly(isobutylene-co-para-methylstyrene) obtained by a solution process (Example 3) is disclosed at FIG. 3.

Example 4: Preparation of Thioacetate Functionalized Butyl Rubber by a Reactive Mixing Process All reactive mixing experiments were performed in a Brabender Intelli-torque internal mixer using roller type 6 blades. The mixer temperature was set to between 120-150° C. 60 g of Bromobutyl 2222 (ExxonMobil Chemical) was added to mixer and allowed to flux for 30 seconds at 25 rpm, ca. 1 g of tetrabutyl ammonium bromide (TBAB) and ca. 1.69-1.78 g (1.20-1.26 mol. equiv. to allylic-Br) of potassium thioacetate. The mixing speed was set to 60 rpm and the reactive mixing was also done sequentially by adding TBAB first and allowed to mix for 10-15 minutes, then potassium thioacetate was added and allowed to mix further for 10-15 minutes. The final mix was removed from the mixer and cooled to room temperature by pressing between two Teflon sheets in a Carver press. The final products was obtained in quantitative yield with ca. >80% conversion by $^1$H-NMR analysis.

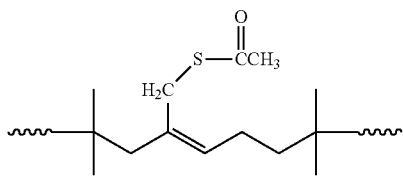

Figure 4:
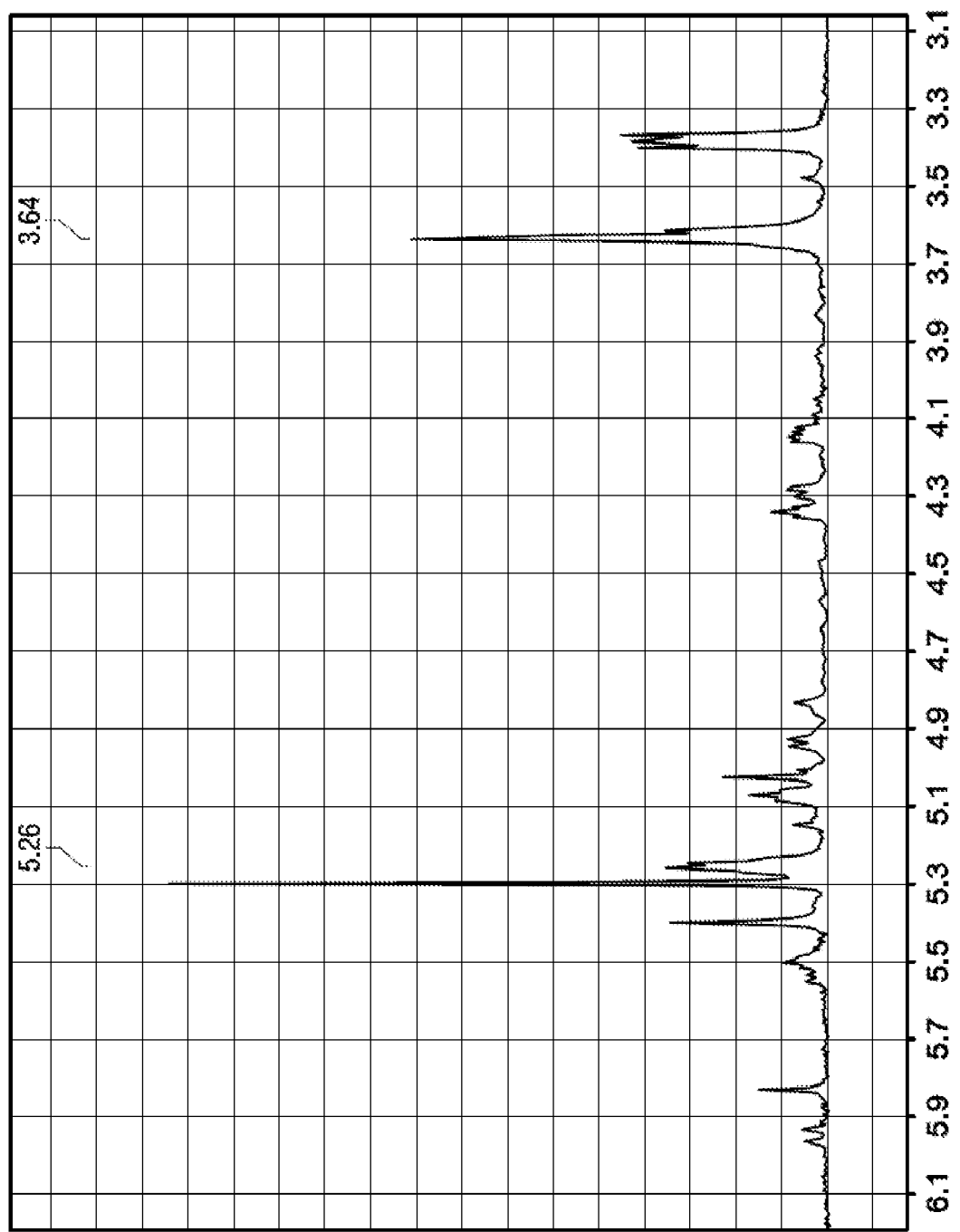
FIG. 4 illustrates a $^1$H-NMR spectra of thioacetate functionalized butyl rubber obtained by a reactive mixing process.

The $^1$H-NMR spectra of the thioacetate functionalized butyl rubber obtained by a reactive mixing process (Example 4) is disclosed at FIG. 4.

Example 5: Preparation of Mercaptobenzothiazole Functionalized Poly(Isobutylene-Co-Para-Methylstyrene) by a Reactive Mixing Process All reactive mixing experiments were performed in a Brabender Intelli-torque internal mixer using roller type 6 blades. The mixer temperature was set to between 70-120° C. 60 g of BIMSM (Exxpro™ NPX 1602 from ExxonMobil Chemical) was added to mixer and allowed to flux for 30 seconds at 25 rpm, 0.45 g (0.11 mol. equiv. to PMS-Br) of tetrabutyl ammonium bromide (TBAB) and 3.09 g (1.25 mol. equiv. to PMS-Br) of sodium mercaptobenzothiazole. The mixing speed was set to 60 rpm and allowed to mix for 15 minutes. The final mix was removed from the mixer and cooled to room temperature by pressing between two Teflon sheets in a Carver press. The final product was obtained in quantitative yield with >92% conversion by $^1$H-NMR analysis.

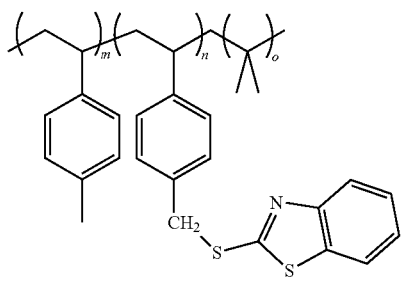

Figure 5:
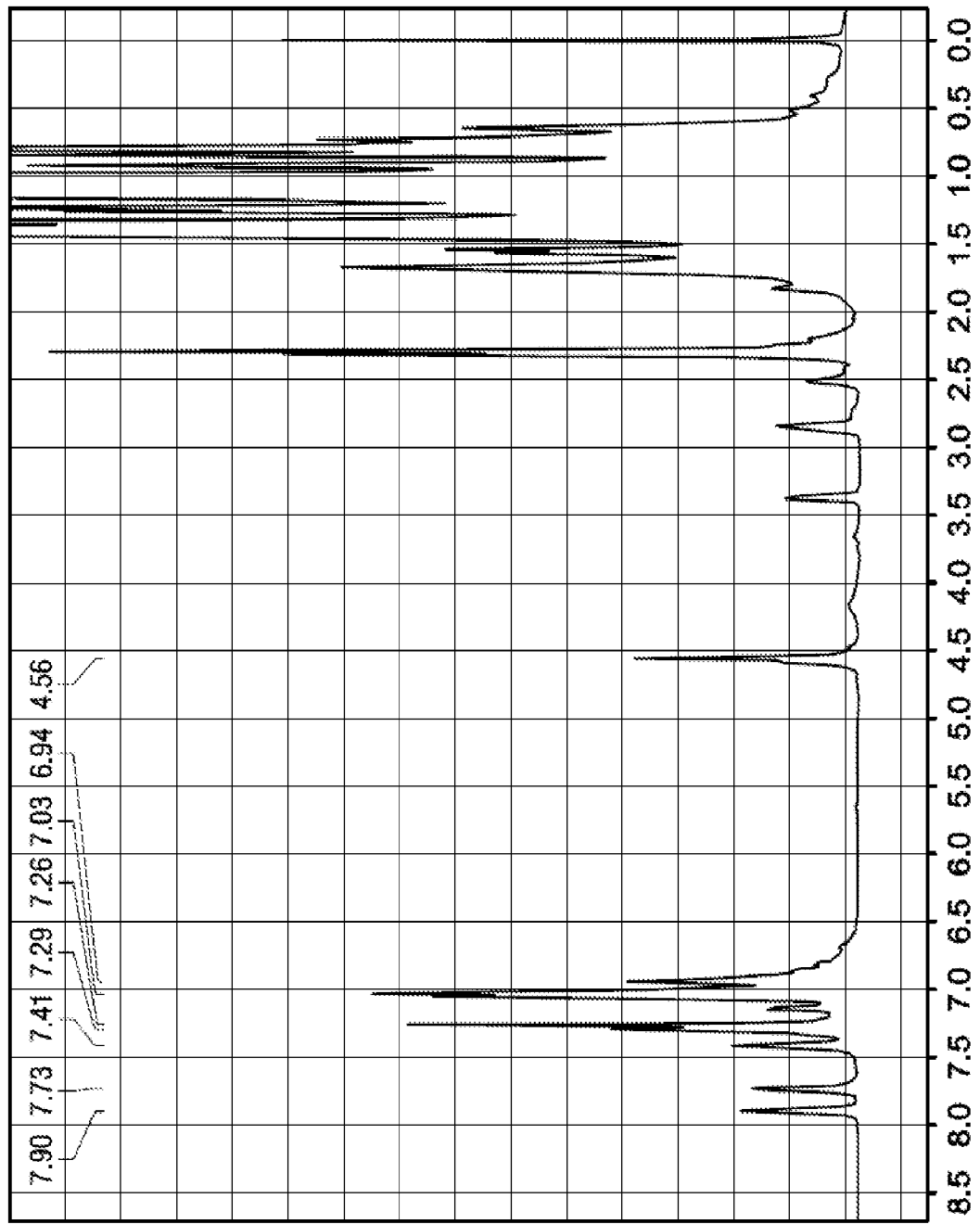
FIG. 5 illustrates a $^1$H-NMR spectrum of mercaptobenzothiazole functionalized poly(isobutylene-co-para-methylstyrene) obtained by a reactive mixing process.

The $^1$H-NMR spectrum of the mercaptobenzothiazole functionalized poly(isobutylene-co-para-methylstyrene) (Example 5) obtained by a reactive mixing process is disclosed at FIG. 5.

Example 6: Preparation of Modified BIMSM-Amine Ionomer Via Reactive Mixing Process All mixing experiments were performed in a Brabender Intelli-torque internal mixer using roller type 6 blades. The mixer temperature was set to 120° C. 60 g of BIMSM (Exxpro™ NPX 1602 from ExxonMobil Chemical) elastomer

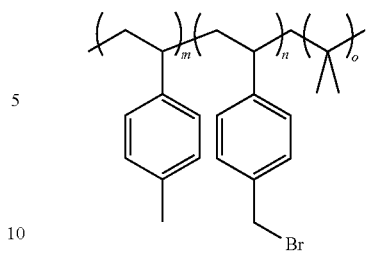

was fluxed for 30 seconds at 60 rpms, 0.5 g (0.13 mol equiv.) of Armeen DMSVD from AkzoNobel was added slowly to the mixer. Once addition is complete, the compound was mixed for 10-12 minutes at 60 rpms. The modified Exxpro™ product mixture was removed from the mixer and cooled to room temperature by pressing between two Teflon sheets in a Carver press.

The resulting BIMSM-amine ionomer product derived from a dimethyl soyaalkylamine (Armeen DMSVD from AkzoNobel) was characterized using proton NMR spectroscopy showing both the methylene proton (~CH$_2$Br), along with a new resonance appearing at 5.38 ppm for olefinic signal.

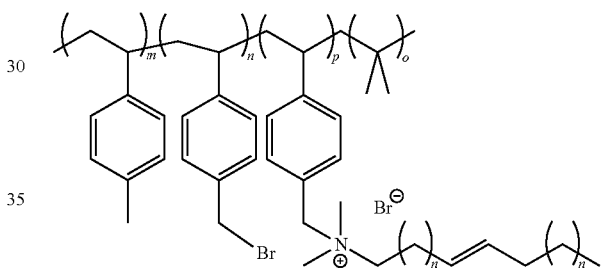

Figure 6:
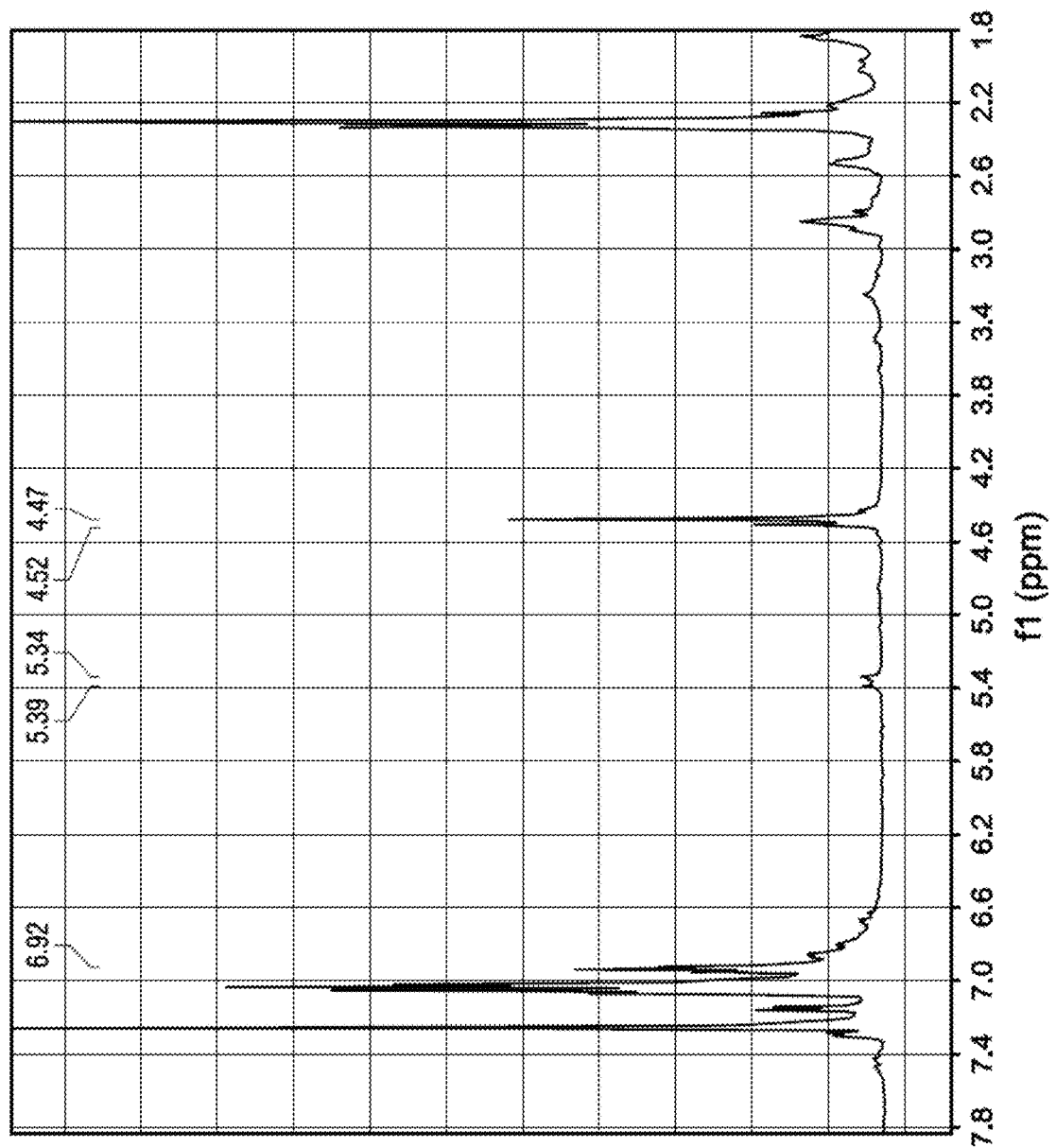
FIG. 6 illustrates a $^1$H-NMR spectra of poly(isobutylene-co-para-methylstyrene)-amine ionomer obtained by a reactive mixing process.

The $^1$H-NMR spectra of the BIMSM-amine ionomer obtained by a reactive mixing process (Example 6) is disclosed at FIG. 6.

Example 7: Preparation of Modified Butyl-Amine Ionomer Via a Reactive Mixing Process All mixing experiments were performed in a Brabender Intelli-torque internal mixer using roller type 6 blades. The mixer temperature was set to 120-150° C. 60 g of Bromobutyl 2222 (ExxonMobil Chemical) was fluxed for 30 seconds at 60 rpms, 1.41 g (0.54 mol equiv.) of Armeen DMSVD from AkzoNobel was added slowly to the mixer. Once addition is complete, the compound was mixed for 10-15 minutes at 60 rpms. The modified butyl product mixture was removed from the mixer and cooled to room temperature by pressing between two Teflon sheets in a Carver press.

The resulting butyl-amine ionomer product was characterized using proton NMR spectroscopy showing both the endo-allylic protons at 4.05, 4.09 ppm along with a new olefinic peak at 5.38 ppm.

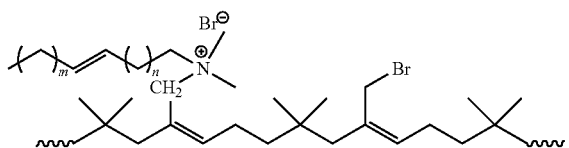

Figure 7:
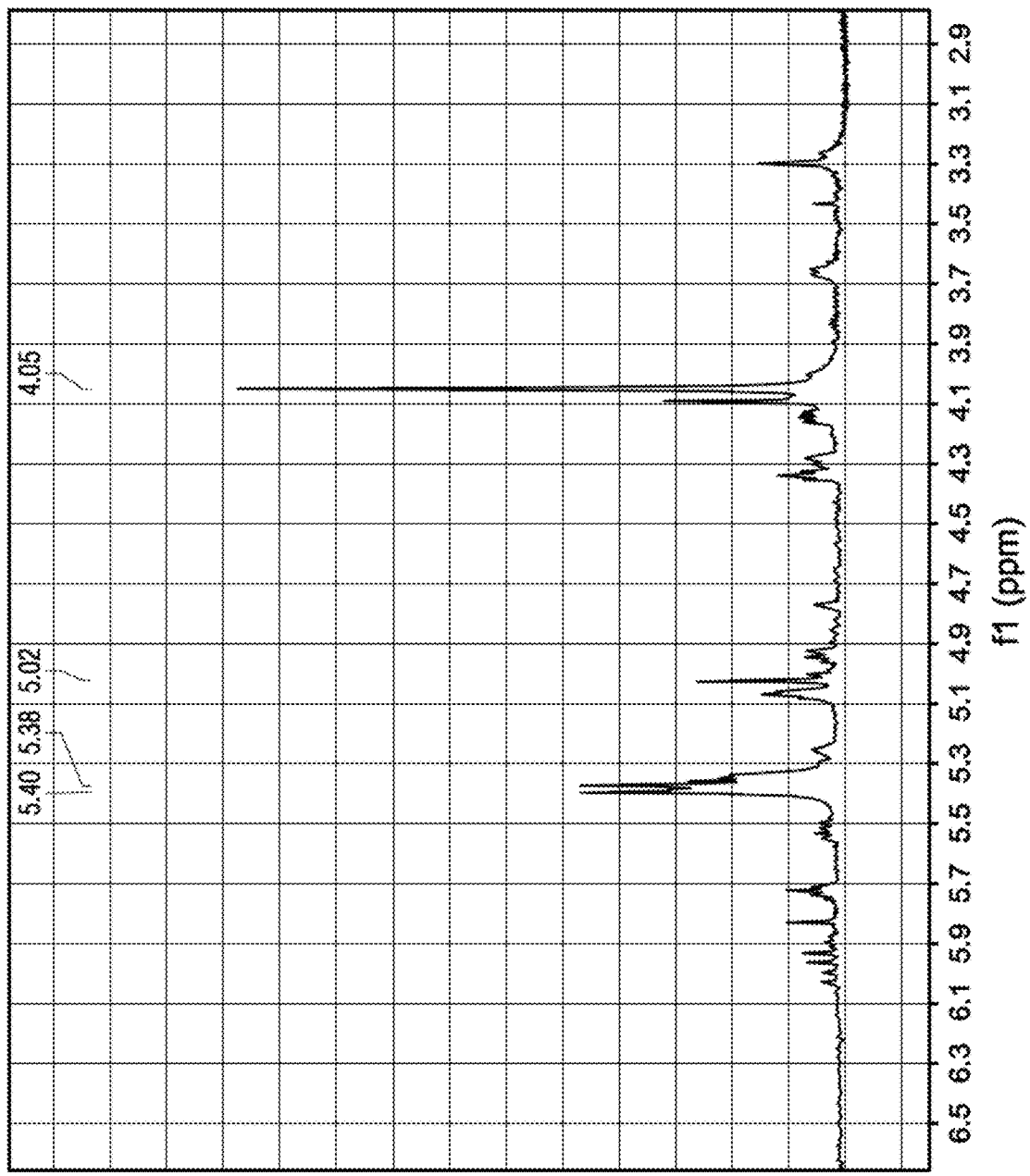
FIG. 7 illustrates a $^1$H-NMR spectra of butyl-amine ionomer obtained by a reactive mixing process.

The 1H-NMR spectra of the butyl-amine ionomer obtained by a reactive mixing process (Example 7) is disclosed at FIG. 7.

Example 8. Preparation of Modified Poly(Isobutylene-Co-Para-Methylstyrene) Containing Citranellol Side Chain Substituents Via Etherfication Using a Solution Process Nucleophilic substitution reaction of Citronellol with Exxpro™ NPX 1602 (ExxonMobil Chemical) was conducted in a SOL glass reactor equipped with a stirrer and chiller. Dry Tetrahydrofuran (THF) (water ppm≤10 ppm) was prepared by passing 99% THF (Sigma Aldrich) through 3 A molecular sieve. 4000 g of Exxpro™ (Mn=221000 g/mole; 5002 g/mole Br; 0.799 mole) was added to the SOL reactor under nitrogen blanket. The polymer was dissolved in the already prepared dry THF (38 L) at constant stirring at 25° C. for 12 hours or until the polymer is dissolved. A catalyst slurry/sodium alkoxide of 7.99 mole (320 g) of Sodium Hydride (60% oil), was prepared by adding slowly 1 L of dry THF & 1.45 L (1247 g, 8.0 moles) of Citronellol under constant stirring. Once the evolution of hydrogen gas is complete, the catalyst slurry prepared was added slowly to the reactor containing dissolved polymer. The reaction mixture was held at 25° C. for 24 h. At the end of the stipulated time, the reaction mixture is introduced into the quench pot containing 100 L of isopropanol to precipitate the functionalized polymer. The precipitated polymer was re-dissolved in a reactor containing 20 L of isohexane and 2 wt % of Butylated hydroxytoluene (BHT; Sigma Aldrich). The re-dissolved polymer was introduced into the 50 L steam stripping pot, connected with a condenser and a chiller. The steam stripping is done using 20 Kg/h of steam under nitrogen blanket. The steam stripped functionalized polymer was finally dried using heated roll mill to obtain 4200 g of functionalized Exxpro™.

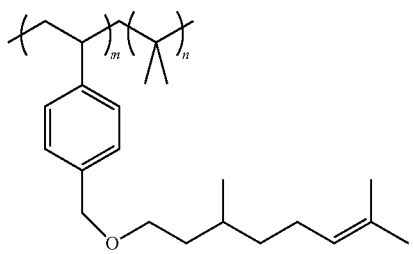

The dried polymer was characterized using proton NMR spectroscopy & FTIR. $^1$H NMR spectroscopy showed complete disappearance of methylene proton (~CH$_2$Br), with new resonance appearing at 4.5 ppm for ~CH$_2$O and olefinic signal at 5.1 ppm suggesting complete conversion at the end of 24 h.

Figure 8:
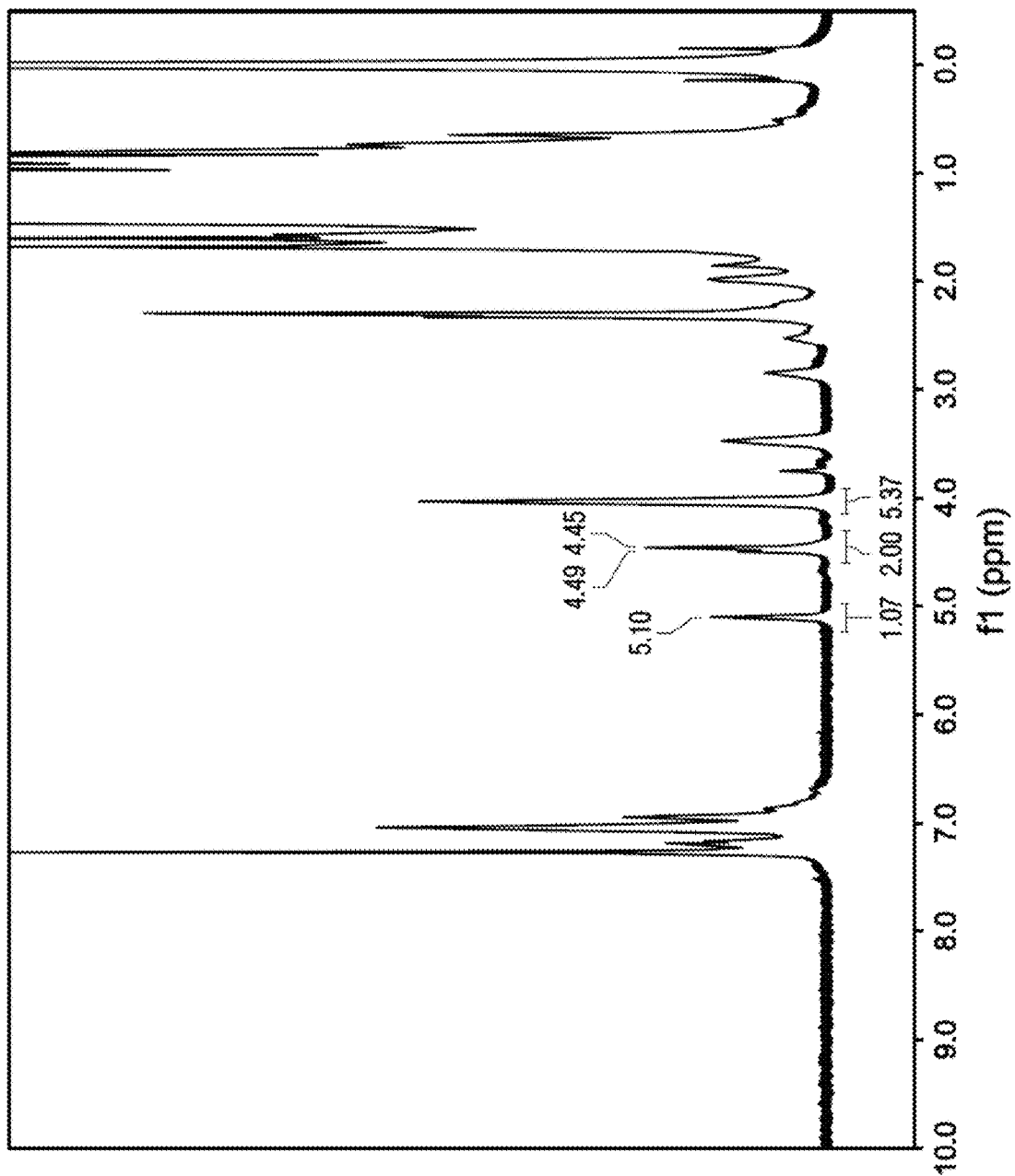
FIG. 8 illustrates a $^1$H-NMR spectra of modified poly(isobutylene-co-para-methylstyrene) containing citranellol obtained by a solution process.

The $^1$H-NMR spectra of the modified poly(isobutylene-co-para-methylstyrene) containing citranellol obtained by solution process (Example 8) is disclosed at FIG. 8.

Example 9. Preparation of (Isobutylene-Co-Isoprene-Co-Para-Methylstyrene) Terpolymer The IB-IP-PMS terpolymer samples were prepared using standard slurry cationic polymerization technique in a dry box. A premixed para-methyl styrene, isoprene, and isobutylene monomer solution in MeCl was prepared at −95° C. An initiator/co-initiator solution of HCl/EtAlCl$_2$ in MeCl was also prepared at −95° C.

The initiator/co-initiator solution was added slowly into mixed monomer solution with stirring.

After approximately 5-10 minutes, the reaction was quenched with a small aliquot of isopropyl alcohol. The resulting polymer was obtained by coagulation with isopropyl alcohol and further dried in a vacuum oven at 50° C. overnight. The overall monomer conversion was approximately about 62 to 82%.

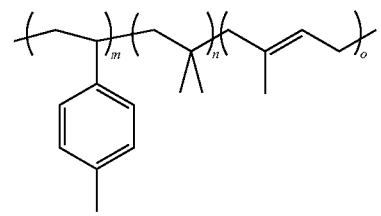

The $^1$H-NMR test method for the Isobutylene-Isoprene-p-methylstyrene terpolymer is disclosed below:

$^1$H NMR samples were prepped at room temperature in CDCl$_3$ (deuterated chloroform) with a concentration of 20 mg/ml.

Samples were run under the following conditions, magnetic field of at least 500 MHz, 5 mm probe, 25° C., 30° tip angle, 800 transients, and a 5 second delay. Reference to isobutylene CH$_3$ peak at 1.12 ppm.

Proton NMR peak assignment for Isobutylene-Isoprene-p-methylstyrene terpolymer

| Name | Shift | # protons |
|---|---|---|
| $I_{PIB}$ | .5-1.17 ppm | 6 |
| $I_{1,4\ Isoprene}$ | 5.02-5.16 ppm | 1 |
| $I_{Minor\ isoprene}$ | 4.92-4.97 ppm | 1 |
| $I_{PMS}$ | 6.2-7.2 ppm | 4 |

I = intensity/area
PIB = IPIB/6
1,4 = I1,4 isoprene
Minor = Iminor isoprene
PMS = IPMS/4
Total = PIB + 1,4 + minor + PMS
Mole % PIB = PIB/total*100
Mole % 1,4 = 1,4/total*100
Mole % PMS = PMS/total*100

| Composition (mol %) | Terpolymer 1 |
|---|---|
| p-methylstyrene | 6.57 |
| isoprene | 0.45 |
| isobutylene | 92.97 |

Figure 9:
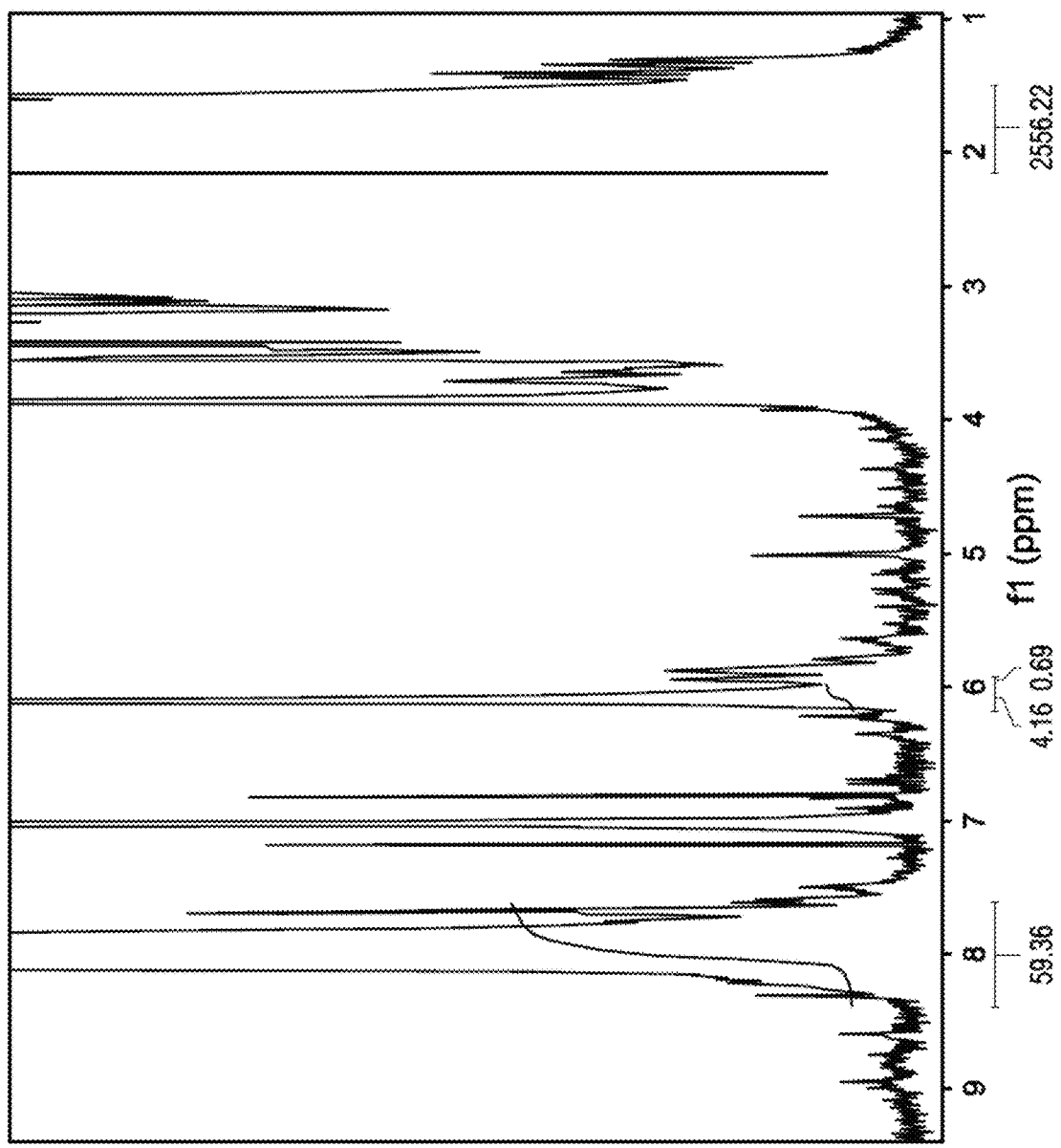
FIG. 9 illustrates a $^1$H-NMR spectra of poly(isobutylene-co-para-methylstyrene-co-isoprene) terpolymer 1.

Isobutylene-co-isoprene-co-para-methylstyrene terpolymer 1 contained 6.57 mol % p-methylstyrene, 0.45% mol % isoprene and 92.97 mol % isobutylene. The $^1$H-NMR spectra of poly(isobutylene-co-para-methylstyrene-co-isoprene) terpolymer 1 is disclosed at FIG. 9.

Example 10. Preparation of Amorphous Propylene-Based Copolymers

Catalyst system: Catalyst precursor was bis((4-triethylsilyl)phenyl)methylene(cyclopentadienyl)(2,7-di-tert-butyl-fluoren-9-yl) hafnium dimethyl. However, other metallocene precursors with good diene incorporation and MW capabilities could also be used.

The activator was dimethylanilinium tetrakis(pentafluorophenyl)borate, but dimethylanilinium-tetrakis(heptafluoronaphthyl)borate and other non-coordinating anion type activators or MAO could also be used.

The copolymer compositions were synthesized in a single continuous stirred tank reactor. A mixture containing unreacted monomers and solvent was fed to the reactor as fuel for a polymerization reaction. The polymerization was performed in solution using isohexane as solvent. During the polymerization process, hydrogen addition and temperature control were used to achieve the desired melt flow rate. The catalyst, activated externally to the reactor, was added as needed in amounts effective to maintain the target polymerization temperature.

In the reactor, the copolymer material was produced in the presence of ethylene, propylene, ethylidene norbornene, and a catalyst comprising the reaction product of N,N-dimethylanilinium tetrakis(pentafluorophenyl)borate and [cyclopentadienyl(2,7-di-t-butylfluorenyl)di-p-triethylsilanephenylmethane] hafnium dimethyl.

The copolymer solution emerging from the reactor was quenched and then devolatilized using conventionally known devolatilization methods, such as flashing or liquid phase separation, first by removing the bulk of the isohexane to provide a concentrated solution, and then by stripping the remainder of the solvent in anhydrous conditions using a devolatilizer so as to end up with a molten polymer composition containing less than 0.5 wt % of solvent and other volatiles. The molten polymer composition was advanced by a screw to a pelletizer from which the polymer composition pellets are submerged in water and cooled until solid.

The ethylene-propylene-diene terpolymer (EPDM) was characterized using proton and carbon NMR spectroscopy.

| Composition (wt %) | EPDM 1 | EPDM 2 | EPDM 3 |
|---|---|---|---|
| C3 (propylene) | 90.6 | 82.0 | 75.6 |
| C2 (ethylene) | 6.9 | 15.3 | 21.6 |
| ENB | 2.5 | 2.8 | 2.8 |

Figure 10:
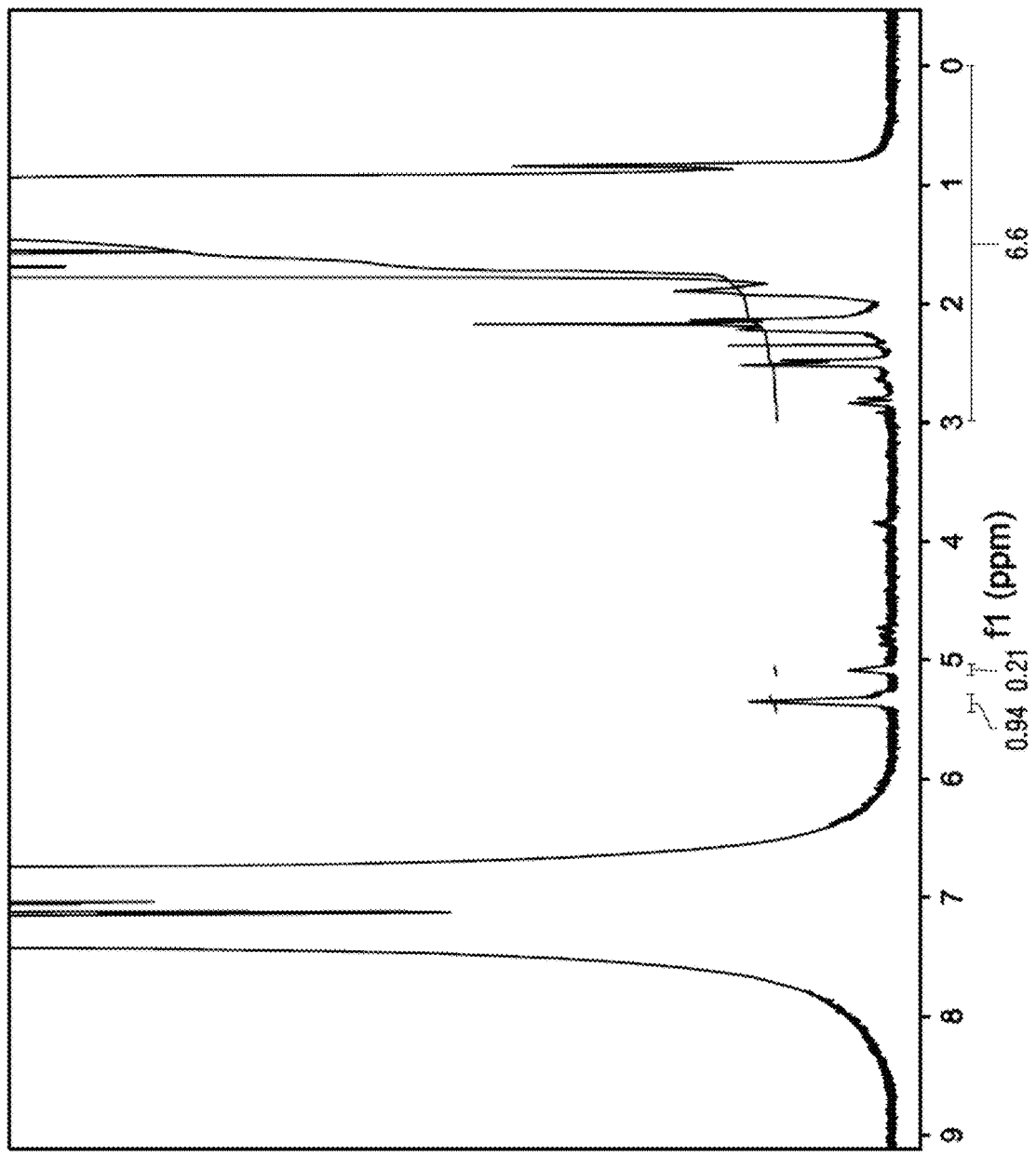
FIG. 10 illustrates a $^1$H-NMR spectra of ethylene-propylene-diene terpolymer 1.

Ethylene-propylene-diene terpolymer, EPDM 1, contained 90.6 wt % propylene, 6.9 wt % ethylene and 2.5 wt % ENB. Ethylene-propylene-diene terpolymer, EPDM 2, contained 82.0 wt % propylene, 15.3 wt % ethylene and 2.8 wt % ENB. Ethylene-propylene-diene terpolymer, EPDM 3, contained 75.6 wt % propylene, 21.6 wt % ethylene and 2.8 wt % ENB. The three ethylene-propylene-diene terpolymers differed in their ratio of propylene to ethylene. EPDM 1 contained the most propylene while EPDM 3 contained the most ethylene. The $^1$H-NMR spectra of EPDM 1 is disclosed at FIG. 10.

$^1$H-NMR Test Method for Ethylene Propylene-Diene Polymer (EPDM)

For $^1$H NMR, sample preparation (polymer dissolution) was performed at 140° C. where 20 miligrams of polymer was dissolved in an appropriate amount of solvent to give a final polymer solution volume of 1 ml.

The $^1$H solution NMR was performed on a 5 mm probe at a field of at least 500 MHz in an ODCB (ortho-dichlorobenzene) and benzene-d$_6$ (C$_6$D$_6$) mixture (9:1) at 120° C. with a flip angle of 30°, 15 s delay, and 512 transients. Chemical shifts were referenced to the ODCB peak at 7.22 ppm. Signals were integrated and the 2-ethylidene-5-norbornene (ENB) weight percent was reported.

Calculation of ENB and double bonds was performed as shown below:
Imajor=Integral of major ENB species from 5.2-5.4 ppm
Iminor=Integral of minor ENB species from 4.6-5.12 ppm
Ialiph=(Integral of —CH$_2$— from 0-3 ppm)
total=(ENB+EP)
total wt=(ENB*120+EP*14)

| Proton NMR peak assignment for EPDM | | | |
|---|---|---|---|
| Peak Assignments | Intensity of species | MOLE % | WEIGHT % |
| Olef: 5.3 and 5.1 ppm ENB | ENB = I$_{major}$ + I$_{minor}$ | ENB*100/ total | ENB*120*100/ total wt |
| Aliphatic: 3-0 ppm | EP = (I$_{aliph}$- 11*ENB)/2 | EP*100/ total | EP*14*100/ total wt |

The $^{13}$C solution NMR was performed on a 10 mm cryoprobe of at least 600 MHz in an ODCB (ortho-dichlorobenzene) and benzene-d6 (C$_6$D$_6$) mixture (9:1) at 120° C. with a flip angle of 90° and inverse gated decoupling. Sample preparation (polymer dissolution) was performed at 140° C. where 0.20 grams of polymer was dissolved in an appropriate amount of solvent to give a final polymer solution volume of 3 ml. Chemical shifts were referenced to the ODCB solvent central peak at 130 ppm. $^{13}$C NMR determines the ethylene and propylene composition, not accounting for the ENB present.

Assignments for ethylene-propylene-diene terpolymers are based on Geert van der Velden, Macromolecules, 1983, 16, 85-89, and Kolbert et. al. Journal of Applied Polymer Science, 1999, 71, 523-530.

Examples 11 to 29

Additive Formulations

TABLE 1 lists the functionalized polymers and their respective additive formulation.

| Polymer Base | Compound ID Example | Polymer Example | Description | Additive Formulation |
|---|---|---|---|---|
| Poly(iso-butylene-co-para-methylstyrene) (Exxpro) | 11 | 5 | Exxpro-mercaptobenzo-thiazole | 1 |
| | 12 | 6 | Exxpro-amine ionomer | 1 |
| | 13 | 3 | Exxpro-thioacetate | 2 |
| Butyl | 14 | 8 | Exxpro-citronellol | 2 |
| | 15 | 7 | Bromobutyl-amine ionomer | 1 |
| | 16 | 4 | Bromobutyl thioacetate | 2 |
| | 17 | Commercial product | Exxon Bromobutyl 2222 | 1 |

TABLE 1-continued lists the functionalized polymers and their respective additive formulation.

| Polymer Base | Compound ID Example | Polymer Example | Description | Additive Formulation |
|---|---|---|---|---|
| | 18 | Commercial product | Exxon SBB 6222 | 1 |
| | 19 | Commercial product | Exxon Chlorobutyl 1066 | 1 |
| | 20 | Commercial product | Exxon Butyl 365 | 3 |
| | 21 | Commercial product | Exxon Butyl 065 | 2 |
| | 22 | 1 | Epoxidized Butyl | 2 |
| EPDM | 23 | 2 | Epoxidized EPDM | 2 |
| | 24 | 10 | EPDM 2 | 2 |
| | 25 | 10 | EPDM 1 | 2 |
| IB-IP-PMS Terpolymer | 26 | 9 | Terpolymer 1 | 2 |

The following additive formulations were used for Examples 11-29. All components are listed in phr, or part per hundred, of polymer unit. These compounds were mixed in suitable mixers, using one pass or multiple successive passes well known to the person skilled in the art. The mixing temperatures range between 110° C. and 210° C. The duration of the mixing for each of the individual mixing steps is between 1 and 30 minutes depending on desired property. The amounts of components in the Additive Formulations are listed in the table below.

| Ingredient | Additive Formulation 1 (phr) | Additive Formulation 2 (phr) | Additive Formulation 3 (phr) |
|---|---|---|---|
| Polymer Listed in Table 1 | 100 | 100 | 100 |
| N330 carbon black (Vulcan ® 3 from Cabot Corp.) | 8 | 8 | 2.5 |
| High-molecular-weight, hindered amine light stabilizer (CHIMASSORB ® 2020 from BASF Corp.) | 0.8 | 0.8 | 0.8 |
| Super fine sulfur (Rubbermakers from Harwick Standard Distribution Corp.) | 2.5 | 2.5 | 2.5 |
| Zinc oxide in naphthenic oil (AKRO-ZINC ® BAR 85 from Akrochem Corp.) | | 1 | 1 |
| Stearic acid (97% stearic acid from Acros Organics) | | 1 | 1 |
| 50:50 blend of Si69 ® and N330 carbon black (X50-S ® from Evonik Industries) | | | 10.5 |
| Total PHR | 111.3 | 113.3 | 118.3 |

Tread Formulations

Tire tread compound formulations are listed in the tables below. All components are listed in phr, or part per hundred, of polymer unit. These compounds were mixed in suitable mixers, using at least two successive passes well known to the person skilled in the art. The non-productive passes (mixing without crosslinking system) have mixing at high temperatures between 110° C. and 190° C. The non-productive passes are followed by a productive pass where the crosslinking system is added. The temperature for this mixing is typically below 110° C. The duration of the mixing for each of the individual mixing steps is between 1 and 20 minutes.

Examples of tire tread formulations are listed in the table below as tread formulations TT1 to TT10. Tread compound controls with no Table 1 polymer additive are tread formulations TT1 and TT10.

Tire Tread Formulations (TT1 to TT10)

| Ingredient | TT1 | TT2 | TT3 | TT4 | TT5 | TT6 | TT7 | TT8 | TT9 | TT10 |
|---|---|---|---|---|---|---|---|---|---|---|
| SBR (1) | 27.5 | 27.5 | 27.5 | 27.5 | 27.5 | 27.5 | 27.5 | 27.5 | 27.5 | 27.5 |
| Silica (2) | 67 | 67 | 67 | 67 | 67 | 67 | 67 | 67 | 67 | 67 |
| NR (3) | 80 | 80 | 80 | 80 | 80 | 80 | 80 | 80 | 80 | 80 |
| Coupling agent (4) | 6.7 | 6.7 | 6.7 | 6.7 | 6.7 | 6.7 | 6.7 | 6.7 | 6.7 | 6.7 |
| Carbon black (5) | 5 | 5 | 5 | 5 | 5 | 5 | 5 | 5 | 5 | 5 |
| Plasticizing agent (6) | 20 | 20 | 20 | 20 | 20 | 20 | 20 | 20 | 20 | 20 |
| Antioxidant (7) | 3 | 3 | 3 | 3 | 3 | 3 | 3 | 3 | 3 | 3 |
| Stearic acid | 2.5 | 2.5 | 2.5 | 2.5 | 2.5 | 2.5 | 2.5 | 2.5 | 2.5 | 2.5 |
| Ex. 11 | | 15 | | | | | | | | |
| Ex. 12 | | | 15 | | | | | | | |
| Ex. 21 (Commercial Product) | | | | 15 | | | | | | |

Tire Tread Formulations (TT1 to TT10)

| Ingredient | TT1 | TT2 | TT3 | TT4 | TT5 | TT6 | TT7 | TT8 | TT9 | TT10 |
|---|---|---|---|---|---|---|---|---|---|---|
| Ex. 24 | | | | | 15 | | | | | |
| Ex. 25 | | | | | | 15 | | | | |
| Ex. 13 | | | | | | | 15 | | | |
| Ex. 26 | | | | | | | | 15 | | |
| Ex. 23 | | | | | | | | | 15 | |
| Zinc oxide (8) | 2 | 2 | 2 | 2 | 2 | 2 | 2 | 2 | 2 | |
| Accelerator 1 (9) | 1.19 | 1.19 | 1.19 | 1.19 | 1.19 | 1.19 | 1.19 | 1.19 | 1.19 | 2 |
| Sulfur (10) | 1.4 | 1.4 | 1.4 | 1.4 | 1.4 | 1.4 | 1.4 | 1.4 | 1.4 | 1.19 |
| Accelerator 2 (11) | 1.4 | 1.4 | 1.4 | 1.4 | 1.4 | 1.4 | 1.4 | 1.4 | 1.4 | 1.4 |
| Total PHR | 217.69 | 232.69 | 232.69 | 232.69 | 232.69 | 232.69 | 232.69 | 232.69 | 232.69 | 217.69 |

(1) Tufdene E680 solution polymerized styrene-butadiene rubber, 34% styrene percent and 58% vinyl 1,2-content based on its polybutadiene portion, 37.5 phr SRAE oil from Asahi Chemical
(2) Amorphous Silica (ZEOSIL ® 1165 MP from Rhodia)
(3) Natural rubber SIR 10 (Standard Indonesian Rubber)
(4) Silane coupling agent TESPT (Si69 ® from Evonik Industries)
(5) Carbon black (VULCAN ® 9 N110 Carbon Black from Cabot Corp.)
(6) Hydrocarbon resin (Escorez ™ 5615 from ExxonMobil Chemical Co.)
(7) N-(1,3-Dimethylbutyl)-N'-phenyl-p-phenylenediamine (Santoflex ® 6-PPD from Flexsys)
(8) Zinc oxide in naphthenic oil (AKRO-ZINC ® BAR 85 from Akrochem Corp.)
(9) N-cyclohexyl-2-benzothiazylsulfenamide (CBS from Kemai Chemical Co.)
(10) 338 Superfine Rubbermakers sulfur (Akrochem Corp.)
(11) Diphenyl guanidine (Ekaland DPG from MLPC International (Arkema)

A second set of tread compound formulations are listed below as tire tread formulations TT11 to TT20. Tread compound controls with no Table 1 polymer additive are tread formulations TT11 and TT20.

Tire Tread Formulations (TT11 to TT20)

| Ingredient | TT11 | TT12 | TT13 | TT14 | TT15 | TT16 | TT17 | TT18 | TT19 | TT20 |
|---|---|---|---|---|---|---|---|---|---|---|
| SBR (1) | 27.5 | 27.5 | 27.5 | 27.5 | 27.5 | 27.5 | 27.5 | 27.5 | 27.5 | 27.5 |
| Silica (2) | 67 | 67 | 67 | 67 | 67 | 67 | 67 | 67 | 67 | 67 |
| NR (3) | 80 | 80 | 80 | 80 | 80 | 80 | 80 | 80 | 80 | 80 |
| Coupling agent (4) | 6.7 | 6.7 | 6.7 | 6.7 | 6.7 | 6.7 | 6.7 | 6.7 | 6.7 | 6.7 |
| Carbon black (5) | 5 | 5 | 5 | 5 | 5 | 5 | 5 | 5 | 5 | 5 |
| Plasticizing agent (6) | 20 | 20 | 20 | 20 | 20 | 20 | 20 | 20 | 20 | 20 |
| Antioxidant (7) | 3 | 3 | 3 | 3 | 3 | 3 | 3 | 3 | 3 | 3 |
| Stearic acid | 2.5 | 2.5 | 2.5 | 2.5 | 2.5 | 2.5 | 2.5 | 2.5 | 2.5 | 2.5 |
| Ex. 19 (Commercial Product) | | 15 | | | | | | | | |
| Ex. 15 | | | 15 | | | | | | | |
| Ex. 16 | | | | 15 | | | | | | |
| Ex. 17 (Commercial Product) | | | | | 15 | | | | | |
| Ex. 14 | | | | | | 15 | | | | |
| Ex. 20 (Commercial Product) | | | | | | | 15 | | | |
| Ex. 22 | | | | | | | | 15 | | |
| Ex. 18 (Commercial Product) | | | | | | | | | 15 | |
| Zinc oxide (8) | 2 | 2 | 2 | 2 | 2 | 2 | 2 | 2 | 2 | 2 |
| Accelerator 1 (9) | 1.19 | 1.19 | 1.19 | 1.19 | 1.19 | 1.19 | 1.19 | 1.19 | 1.19 | 1.19 |
| Sulfur (10) | 1.4 | 1.4 | 1.4 | 1.4 | 1.4 | 1.4 | 1.4 | 1.4 | 1.4 | 1.4 |
| Accelerator 2 (11) | 1.4 | 1.4 | 1.4 | 1.4 | 1.4 | 1.4 | 1.4 | 1.4 | 1.4 | 1.4 |
| Total PHR | 217.69 | 232.69 | 232.69 | 232.69 | 232.69 | 232.69 | 232.69 | 232.69 | 232.69 | 217.69 |

(1) Tufdene E680 solution polymerized styrene-butadiene rubber, 34% styrene percent and 58% vinyl 1,2-content based on its polybutadiene portion, 37.5 phr SRAE oil from Asahi Chemical
(2) Amorphous Silica (ZEOSIL ® 1165 MP from Rhodia)
(3) Natural rubber SIR 10 (Standard Indonesian Rubber)
(4) Silane coupling agent TESPT (Si69 ® from Evonik Industries)
(5) Carbon black (VULCAN ® 9 N110 Carbon Black from Cabot Corp.)
(6) Hydrocarbon resin (Escorez ™ 5615 from ExxonMobil Chemical Co.)
(7) N-(1,3-Dimethylbutyl)-N'-phenyl-p-phenylenediamine (Santoflex ® 6-PPD from Flexsys)
(8) Zinc oxide in naphthenic oil (AKRO-ZINC ® BAR 85 from Akrochem Corp.)
(9) N-cyclohexyl-2-benzothiazylsulfenamide (CBS from Kemai Chemical Co.)
(10) 338 Superfine Rubbermakers sulfur (Akrochem Corp.)
(11) Diphenyl guanidine (Ekaland DPG from MLPC International (Arkema)

Loss Tangent Measurements
Dynamic Mechanical Thermal Analysis (DMTA) Test Method All tread formulations were compression molded and cured into pads. Afterward, a rectangular test specimen (12 mm wide & 30 mm long) was died out of the cured pads and mounted in an ARES G2 (Advanced Rheometric Expansion System, TA instruments) for dynamic mechanical testing in torsion rectangular geometry. Though the thickness of the test specimen was around 1.8 mm, the thickness of the specimens varied and was measured manually for each test. A strain sweep at room temperature up to 5.5% strains and at 10 Hz was conducted first followed by a temperature sweep at 4% strain and 10 Hz from −26° C. to 100° C. at 2° C./min ramp rates. Storage and loss moduli were measured along with the loss tangent values. For better wet traction, it is preferred to have higher loss tangent values at a temperatures of 0° C. For better rolling resistance, the loss tangent is preferred to be lower at a temperature of 60° C.

The tables below provide the loss tangent measurements and the normalized loss tangent measurements for the all-season tire tread formulations TT1 to TT10 and TT11 to TT20, respectively, using the polymers of Table 1. The tables with the normalized loss tangent measurements provide the same measurements but as a percentage of the corresponding control tire tread formulation, TT1 and TT10 for TT2 to TT9 and TT11 and TT20 for TT12 to TT19. Control tire tread formulations TT1, TT10, TT11 and TT20 do not contain a polymer from Table 1.

| Temperature (° C.) | Controls TT1 & TT10 | TT2 | TT3 | TT4 | TT5 | TT6 | TT7 | TT8 | TT9 |
|---|---|---|---|---|---|---|---|---|---|
| DMTA Tan (delta) Test Results for tire tread formulations TT1 to TT10 | | | | | | | | | |
| Tan Delta | | | | | | | | | |
| 0 | 0.592 | 0.615 | 0.613 | 0.595 | 0.620 | 0.704 | 0.615 | 0.624 | 0.684 |
| 60 | 0.142 | 0.126 | 0.132 | 0.135 | 0.146 | 0.147 | 0.134 | 0.143 | 0.144 |
| Tan Delta-Normalized to control samples | | | | | | | | | |
| 0 | 100 | 103.9 | 103.6 | 100.6 | 104.9 | 119.0 | 103.9 | 105.5 | 115.6 |
| 60 | 100 | 88.9 | 92.7 | 95.2 | 102.6 | 103.7 | 94.3 | 100.5 | 101.3 |

The addition of the polymer additive compound (Table 1) to the all-season tread formulation, as compared to the corresponding control, improved wet traction (increased loss tangent at 0° C.) by 3 to 19 percent and/or improved roll resistance (decreased loss tangent at 60° C.). Improved wet traction is important for all-season tire tread formulations.

| Temperature (° C.) | Control TT11 & TT20 | TT12 | TT13 | TT14 | TT15 | TT16 | TT17 | TT18 | TT19 |
|---|---|---|---|---|---|---|---|---|---|
| DMTA Tan (delta) and Normalized Tan (delta) Test Results for tire tread formulations TT11 to TT20 | | | | | | | | | |
| Tan Delta | | | | | | | | | |
| 0 | 0.587 | 0.610 | 0.606 | 0.593 | 0.604 | 0.614 | 0.601 | 0.609 | 0.614 |
| 60 | 0.142 | 0.133 | 0.131 | 0.126 | 0.139 | 0.126 | 0.139 | 0.127 | 0.148 |
| Tan Delta-Normalized to control samples | | | | | | | | | |
| 0 | 100 | 104.0 | 103.3 | 101.0 | 102.8 | 104.6 | 102.4 | 103.8 | 104.5 |
| 60 | 100 | 93.8 | 92.2 | 89.1 | 98.0 | 88.7 | 97.8 | 89.5 | 104.7 |

The addition of the polymer/additive compound (Table 1) to the all-season tire tread formulation, as compared to the corresponding control, improved wet traction (increased loss tangent at 0° C.) by 1 to 4 percent for tire tread formulations TT12 to TT19 and improved roll resistance (decreased loss tangent at 60° C.) by 1 to 11 percent for tire tread formulations TT12 to TT19. Improved wet traction and improved roll resistance are important for all season tread formulations. Tire tread formulation TT19, which contained the commercial product (Exxon SBB 6222, a brominated star branched butyl rubber) did not exhibit improved roll resistance.

In the specification and in the claims, the terms "including" and "comprising" are open-ended terms and should be interpreted to mean "including, but not limited to". These terms encompass the more restrictive terms "consisting essentially of" and "consisting of."

It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

What is claimed is:

1. An elastomeric composition comprising, per 100 parts by weight of rubber (phr):
    about 5 to about 40 phr of styrene/butadiene copolymer;
    about 60 to about 100 phr of natural rubber or polyisoprene;
    a curative agent;
    an antioxidant;
    about 1 to about 20 phr carbon black;
    about 5 to about 40 phr plasticizing agent;
    about 40 to about 80 phr silica;
    about 1 to about 20 phr silane coupling agent;
    and about 5 to about 30 phr of a polymer selected from the group consisting of ethylene-propylene-diene terpolymer, butyl rubber, poly(isobutylene-co-para-methylstyrene) and poly(isobutylene-co-para-methylstyrene-co-isoprene) terpolymer, wherein the polymer is functionalized with an epoxy, thioacetate, mercaptobenzothiazole, amine ionomer, phosphine ionomer or citranellol functional group.

2. The elastomeric composition of claim 1, wherein the ethylene-propylene-diene terpolymer is epoxidized ethylene-propylene-diene terpolymer.

3. The elastomeric composition of claim 1, wherein the ethylene-propylene-diene terpolymer contains from about 1 to 10 wt % ethylidene norbornene based on the terpolymer.

4. The elastomeric composition of claim 1, wherein the ethylene-propylene-diene terpolymer contains from about 5 to 25 wt % ethylene based on the terpolymer.

5. The elastomeric composition of claim 1, wherein the ethylene-propylene-diene terpolymer contains from about 65 to 95 wt % propylene based on the terpolymer.

6. The elastomeric composition of claim 1, wherein the polymer is halogenated.

7. The elastomeric composition of claim 1, wherein the butyl rubber is brominated poly(isobutylene-co-isoprene).

8. The elastomeric composition of claim 7, wherein the brominated poly(isobutylene-co-isoprene) is an amine ionomer derived from brominated poly(isobutylene-co-isoprene).

9. The elastomeric composition of claim 7, wherein the brominated poly(isobutylene-co-isoprene) is star-branched brominated poly(isobutylene-co-isoprene).

10. The elastomeric composition of claim 1, wherein the poly(isobutylene-co-para-methylstyrene) is brominated poly(isobutylene-co-para-methylstyrene).

11. The elastomeric composition of claim 10, wherein the poly(isobutylene-co-para-methylstyrene) is an amine ionomer derived from brominated poly(isobutylene-co-para-methylstyrene).

12. The elastomeric composition of claim 1, wherein the poly(isobutylene-co-para-methylstyrene) is a thioacetate functionalized poly(isobutylene-co-para-methylstyrene).

13. The elastomeric composition of claim 1, wherein the poly(isobutylene-co-para-methylstyrene) is a citronellol functionalized poly(isobutylene-co-para-methylstyrene).

14. The elastomeric composition of claim 1, wherein the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is further functionalized with sulfur.

15. The elastomeric composition of claim 1, wherein the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is further functionalized with sulfur and an activator.

16. The elastomeric composition of claim 1, wherein the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is further functionalized with sulfur, an activator and a silane coupling agent.

17. The elastomeric composition of claim 16, wherein the silane coupling agent is selected from the group consisting of triethoxysilylpropyl) tetrasulphide, bis[3-(diethoxyoctyloxysilyl)propyl]tetrasulfide and bis(triethoxysilylpropyl) tetrasulphide.

18. The elastomeric composition of claim 1, wherein the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is further functionalized with sulfur, a vulcanizing accelerator and a silane coupling agent.

19. The elastomeric composition of claim 1, wherein the polymer selected from the group consisting of ethylene-propylene-diene terpolymer, butyl rubber, poly(isobutylene-co-para-methylstyrene) and poly(isobutylene-co-para-methylstyrene-co-isoprene) terpolymer is further functionalized with sulfur and a vulcanizing accelerator.

20. The elastomeric composition of claim 1, wherein the plasticizing agent is a hydrocarbon resin.

21. The elastomeric composition of claim 1, wherein the glass transition temperature (Tg) is from about 20° C. to about −60° C.

22. The elastomeric composition of claim 1, wherein the poly(isobutylene-co-para-methylstyrene-co-isoprene) terpolymer contains from 4-8 mol % p-methylstyrene, 0.2-2 mol % isoprene and 90-95 mol % isobutylene based on the terpolymer.

23. A tire tread composition comprising the elastomeric composition of claim 1.

24. An elastomeric composition comprising, per 100 parts by weight of rubber (phr):
    about 5 to about 40 phr of styrene/butadiene copolymer;
    about 60 to about 100 phr of natural rubber or polyisoprene;
    a curative agent;

an antioxidant;
about 1 to about 20 phr carbon black;
about 5 to about 40 phr plasticizing agent;
about 40 to about 80 phr silica;
about 1 to about 20 phr silane coupling agent; and
about 5 to about 30 phr of a poly(isobutylene-co-para-methylstyrene) functionalized with one or more citranellol functional groups.

25. An elastomeric composition comprising, per 100 parts by weight of rubber (phr):
about 5 to about 40 phr of styrene/butadiene copolymer;
about 60 to about 100 phr of natural rubber or polyisoprene;
a curative agent;
an antioxidant;
about 1 to about 20 phr carbon black;
about 5 to about 40 phr plasticizing agent;
about 40 to about 80 phr silica;
about 1 to about 20 phr silane coupling agent; and
about 5 to about 30 phr of a mercaptobenzothiazole functionalized poly(isobutylene-co-para-methylstyrene).

* * * * *